(12) United States Patent
Goulis et al.

(10) Patent No.: US 11,703,394 B2
(45) Date of Patent: Jul. 18, 2023

(54) SYSTEMS AND METHODS FOR SMART THERMOCOUPLE TEMPERATURE PROBE

(71) Applicant: Emerson Digital Cold Chain, Inc., Kennesaw, GA (US)

(72) Inventors: Philip Goulis, Middlefield, CT (US); Gary Sawicki, Durham, CT (US)

(73) Assignee: Emerson Digital Cold Chain, Inc., Kennesaw, GA (US)

( * ) Notice: Subject to any disclaimer, the term of this patent is extended or adjusted under 35 U.S.C. 154(b) by 0 days.

(21) Appl. No.: 17/585,659

(22) Filed: Jan. 27, 2022

(65) Prior Publication Data
US 2022/0146328 A1 May 12, 2022

Related U.S. Application Data

(62) Division of application No. 16/368,408, filed on Mar. 28, 2019, now Pat. No. 11,274,973.

(60) Provisional application No. 62/650,101, filed on Mar. 29, 2018.

(51) Int. Cl.
*G01K 7/14* (2006.01)
*G01K 7/02* (2021.01)

(52) U.S. Cl.
CPC .............. *G01K 7/14* (2013.01); *G01K 7/023* (2013.01)

(58) Field of Classification Search
CPC .................................. G01K 7/14; G01K 7/023
USPC ................................................. 374/208, 141
See application file for complete search history.

(56) References Cited

U.S. PATENT DOCUMENTS

| 4,962,765 | A | 10/1990 | Kung et al. |
| 5,088,835 | A | 2/1992 | Shigezawa et al. |
| 5,857,777 | A | 1/1999 | Schuh |
| 7,507,019 | B2 | 3/2009 | Price |

(Continued)

FOREIGN PATENT DOCUMENTS

| CA | 2713058 A1 | 2/2011 |
| CH | 691122 A5 | 4/2001 |

(Continued)

OTHER PUBLICATIONS

International Search Report regarding International Application No. PCT/US2019/024925, dated Aug. 9, 2019.

(Continued)

*Primary Examiner* — Mirellys Jagan
(74) *Attorney, Agent, or Firm* — Harness, Dickey & Pierce, P.L.C.

(57) ABSTRACT

A system includes a measurement instrument including a first connector, a control module, and a display. A temperature probe includes a shaft and a tip. A second connector is coupled to a first end of the shaft. The tip is coupled to a second end of the shaft and measures a change in temperature of a sample. The second connector is received by the first connector when the temperature probe is attached to the measurement instrument. A storage module is housed within the second connector and stores parameters of the temperature probe. The control module receives the parameters, prompts a user to select the sample on the display, and determines a thermal conductivity and a stable time of the sample. When the stable time has elapsed, the control module determines a temperature measurement based on a change in voltage and displays the temperature measurement on the display.

8 Claims, 32 Drawing Sheets

(56) References Cited

U.S. PATENT DOCUMENTS

| | | | |
|---|---|---|---|
| 8,931,400 B1 | 1/2015 | Allen | |
| 2005/0157775 A1 | 7/2005 | Chapman | |
| 2007/0116084 A1 | 5/2007 | Rund et al. | |
| 2010/0027582 A1 | 2/2010 | Lane et al. | |
| 2010/0036279 A1* | 2/2010 | Rieth | A61B 5/4294 600/551 |
| 2012/0065923 A1 | 3/2012 | Whiteley | |
| 2021/0013657 A1 | 1/2021 | Bacher | |
| 2021/0018374 A1* | 1/2021 | Herceg | G01K 3/005 |

FOREIGN PATENT DOCUMENTS

| | | |
|---|---|---|
| CN | 202255629 U | 5/2012 |
| CN | 102865933 A | 1/2013 |
| CN | 204202762 U | 3/2015 |
| CN | 106821017 A | 6/2017 |
| CN | 107607224 A | 1/2018 |
| DE | 202016102171 U1 | 7/2017 |
| EP | 1021979 A1 | 7/2000 |
| EP | 1271061 A2 | 1/2003 |
| EP | 1726882 A1 | 11/2006 |
| EP | 1793173 A1 | 6/2007 |
| JP | H08233666 A | 9/1996 |
| JP | 2013075032 A | 4/2013 |
| WO | WO-2014153035 A1 | 9/2014 |

OTHER PUBLICATIONS

Written Opinion regarding International Application No. PCT/US2019/024925, dated Aug. 9, 2019.
Election Requirement regarding U.S. Appl. No. 16/368,408 dated Mar. 9, 2021.
Non-Final Office Action regarding U.S. Appl. No. 16/368,408 dated May 12, 2021.
Final Office Action regarding U.S. Appl. No. 16/368,408 dated Sep. 3, 2021.
Extended European Search Report regarding Application No. EP19774677 dated Oct. 28, 2021.
Notice of Allowance regarding U.S. Appl. No. 16/368,408 dated Oct. 27, 2021.
First Office Action regarding Chinese Patent Application No. 201980023778.5, dated Sep. 5, 2022. Translation provided by Unitalen Attorneys at Law.
Second Office Action regarding Chinese Patent Application No. 201980023778.5, dated Apr. 14, 2023. Translation provided by Unitalen Attorneys at Law.
"Make Foreign Things Serve China: A Collection of Translation of Temperature Measuring Techniques and Instruments," First Mechanical Thermal Instrument Scientific Research Institute, published by Mechanical Thermal Instrument Scientific Research Institute, pp. 50-51, dated Nov. 30, 1969.

* cited by examiner

FIG. 12

| Module | Description |
|---|---|
| General | Database Designing |
| General | End to End Skelleton Architecture |
| General | Caching |
| General | Logging |
| Security Services | Identity Provider design - LDAP |
| Security Services | CRUD User Roles |
| Security Services | CRUD Users |
| Security Services | User Login |
| Security Services | User Authorization - Role based Acess |
| Security Services | Consuming Client SSO* - This will be done when MacDonal onboard |
| Notification Service | Add and Configure Notifications and Alerts |
| Notification Service | Trigger Notification - Text and Email |
| Notification Service | Show Notification Summary |
| Payment Service | Renewals |
| Payment Service | Location-wise Sensor Summary |
| Payment Service | Payment Authorization Gateways |
| Payment Service | Reports |
| Configuration Service | CRUD new Client |
| Configuration Service | CRUD Client Stores/Locations |
| Configuration Service | CRUD Devices and Sensors |
| Configuration Service | Sync Users from NotifEye Database |
| Configuration Service | Sync Devices or Sensors from NotifEye Database |

1200

Role Based Authorization

- User Authorization will be maintained by Security Service. It will be role based authentication
- For Example
  - Admin Role - Users who will do the configuration e.g. Managing Clients, Locations, Sensors, notifications etc.
  - Supervisors - Users who will have more managed role access than a normal end users.
  - End Users - Who will access Dashboard application in read only mode.

FIG. 19

TACO BELL

| | Active Sensors | InActive Sensors | Low Battery | With Aletrs | Connectivity Issues |
|---|---|---|---|---|---|
| | 80 | 23 | 45 | 15 | 27 |

Select a Location ▶

| Current | History | Map |

Show 10 ▶ XXXX                                                    Search

Temperature and Humidity readings for the work shown below please use the result and previous buttons to see more records

| Device No | Security | Source | Alert Type | Time |
|---|---|---|---|---|
| 2001 | Sar 5 | Location 1 / Sensor | Temp | 10:35 AM |
| 2001 | Sar 5 | Location 1 / Sensor | Temp | 10:35 AM |
| 2002 | Sar 5 | Location 1 / Sensor | Temp | 10:35 AM |
| 2002 | Sar 5 | Location 2 / Sensor | Temp | 10:45 AM |
| 2003 | Sar 2 | Location 2 / Sensor | Temp | 10:35 AM |
| 2003 | Sar 2 | Location 3 / Sensor | Humidity | 10:35 AM |
| 2003 | Sar 2 | Location 3 / Sensor | Humidity | 10:45 AM |
| 2004 | Sar 1 | Location 3 / Sensor | Temp | 10:40 AM |
| 2004 | Sar 1 | Location 4 / Sensor | Temp | 10:45 AM |
|   |   | 4 |   |   |

Showing 1 to 10 of 10 entites                                Previous  2  Next

👤John Doe ▶

| | |
|---|---|
| Cooper Atkins | |
| NotifEye | |
| HACCP | |
| About | |

Payments and Renewals — ◉ John Doe ▼

License Details — Ver 1.0.0.1

🌐 Integrated Dashboard

From
© 2018 Cooper Atkins Corporation
All Rights Reserved
Phone 1(608)123-9676
Email-abcd@abc.com To
John Doe
705 Freedom......
New York,CA
Phone 1(608)123-9676
Email-abcd@abc.com Invoice-XXXX
Order ID: XXXX
Payment Due - XXXX
Account - XXXX

| No. | Product | Serial # | Number of devices | |
|---|---|---|---|---|
| 1. | Integrated Dashboard WebApp | XXX-XXX-XXX | 100-1000Devices ▼ | $6400.50 |
| 2. | NotifEye | XXX-XXX-XXX | 200-500Devices ▼ | $5000.00 |
| 3. | | XXX-XXX-XXX | 100-200Devices ▼ | $1000.70 |

Payment Methods

| VISA | ⊙ | AMERICAN EXPRESS | PayPal |

XXXX XXXX XXXX

Amount Due 16/09/2017

| Subtotal: | $ 25000.00 |
|---|---|
| Tax (9.3%) | $ 1000.34 |
| Total | $ 26500.24 |

🔍 Generate PDF     ☐ Submit Payment

🖨 Print

SYSTEMS AND METHODS FOR SMART THERMOCOUPLE TEMPERATURE PROBE

CROSS-REFERENCE TO RELATED APPLICATIONS

This application is a divisional of U.S. patent application Ser. No. 16/368,408 filed on Mar. 28, 2019. This application claims the benefit of U.S. Provisional Application No. 62/650,101, filed on Mar. 29, 2018. The entire disclosure of the above application is incorporated herein by reference.

FIELD

The present disclosure relates to thermocouples and more particularly to smart thermocouple temperature probe control systems and methods.

BACKGROUND

In the food service industry, accurately measuring temperature of food products during storage and preparation may be crucial for food safety and food quality. As such, a thermocouple may be used to measure the temperature of food products or environment surfaces. The thermocouple may include two wires that are made from different alloys and are welded together at one end, creating a junction. Temperature is measured at the junction. A voltage may be generated based on the temperature experienced at the junction. The temperature may be determined using a lookup table that corresponds change in voltages to temperatures.

There are a variety of types of thermocouples, such as a type-K, type-J, type-T, type-E, and so on. Each type of thermocouple may have different characteristics (e.g., operational temperate range, tolerance range, durability, etc.). Thermocouples may also be used to measure temperature in various applications, such as in industrial and scientific applications.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system includes a measurement instrument including a first connector and a control module electrically connected to the first connector. The system includes a temperature probe including a shaft and a tip, the shaft having a first end and a second end, a second connector being coupled to the first end, the tip being coupled to the second end and configured to measure a change in temperature of a sample, and the second connector being received by the first connector when the temperature probe is attached to the measurement instrument. The system includes a storage module housed within the second connector and configured to store one or more parameters of the temperature probe. The control module being configured to: receive the one or more parameters from the storage module; determine a temperature measurement based on a change in voltage; determine a first correction based on the one or more parameters; and determine an adjusted temperature measurement based on the temperature measurement and the first correction.

A system includes a measurement instrument including a first connector, a control module electrically connected to the first connector, and a display housed on the measurement instrument. The system includes a temperature probe including a shaft and a tip, the shaft having a first end and a second end, a second connector being coupled to the first end, the tip being coupled to the second end and configured to measure a change in temperature of a sample, and the second connector being received by the first connector when the temperature probe is attached to the measurement instrument. The system includes a storage module housed within the second connector and configured to store one or more parameters of the temperature probe. The control module being configured to: receive the one or more parameters from the storage module; prompt a user to select the sample on the display; determine a thermal conductivity of the sample; determine a stable time of the sample; when a period greater than or equal to the stable time has elapsed, determine a temperature measurement based on a change in voltage; and display the temperature measurement on the display.

A method of determining a temperature includes storing one or more parameters of a temperature probe by a storage module. The method includes receiving the one or more parameters from the storage module. The method includes determining a temperature measurement based on a change in voltage of the temperature probe. The method includes determining a first correction based on the one or more parameters. The method includes determining an adjusted temperature measurement based on the temperature measurement and the first correction. The method includes displaying the adjusted temperature measurement on a display.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 12 is a screenshot of an example project module classification.

FIG. 19 is a screenshot of an example security service authorization.

FIG. 26 is a screenshot of an example dashboard history.

FIG. 28 is a screenshot of an example payment and renewal cart view.

In the drawings, reference numbers may be reused to identify similar and/or identical elements.

DETAILED DESCRIPTION

A thermocouple system includes a measurement instrument and a temperature probe. The thermocouple system may be used to take a temperature measurement of a sample. The measurement instrument and the temperature probe may be calibrated together as a single system to prevent inaccurate temperature measurements before the thermocouple system is shipped from a factory. Under some circumstances, the temperature probe may degrade over time and may need to be either replaced with a new temperature probe, or recalibrated to maintain system accuracy.

According to the present disclosure, the temperature probe may include a storage module that is configured to store and transmit one or more parameters of the temperature probe to the measurement instrument. The one or more parameters may include calibration parameters of the temperature probe. The calibration parameters are determined based on an expected electrical response (e.g., voltage) of the temperature probe at a predetermined temperature. Additionally or alternatively, the one or more parameters may include a response time of the temperature probe. The response time of the temperature probe is the period it takes the temperature probe to respond to the change in temperature. Additionally or alternatively, the one or more parameters may include a unique identifier (e.g., serial number) of the temperature probe. The unique identifier may prevent any additional input from the user in order to keep a record that associates a particular temperature probe with a particular temperature measurement.

Figure 1:
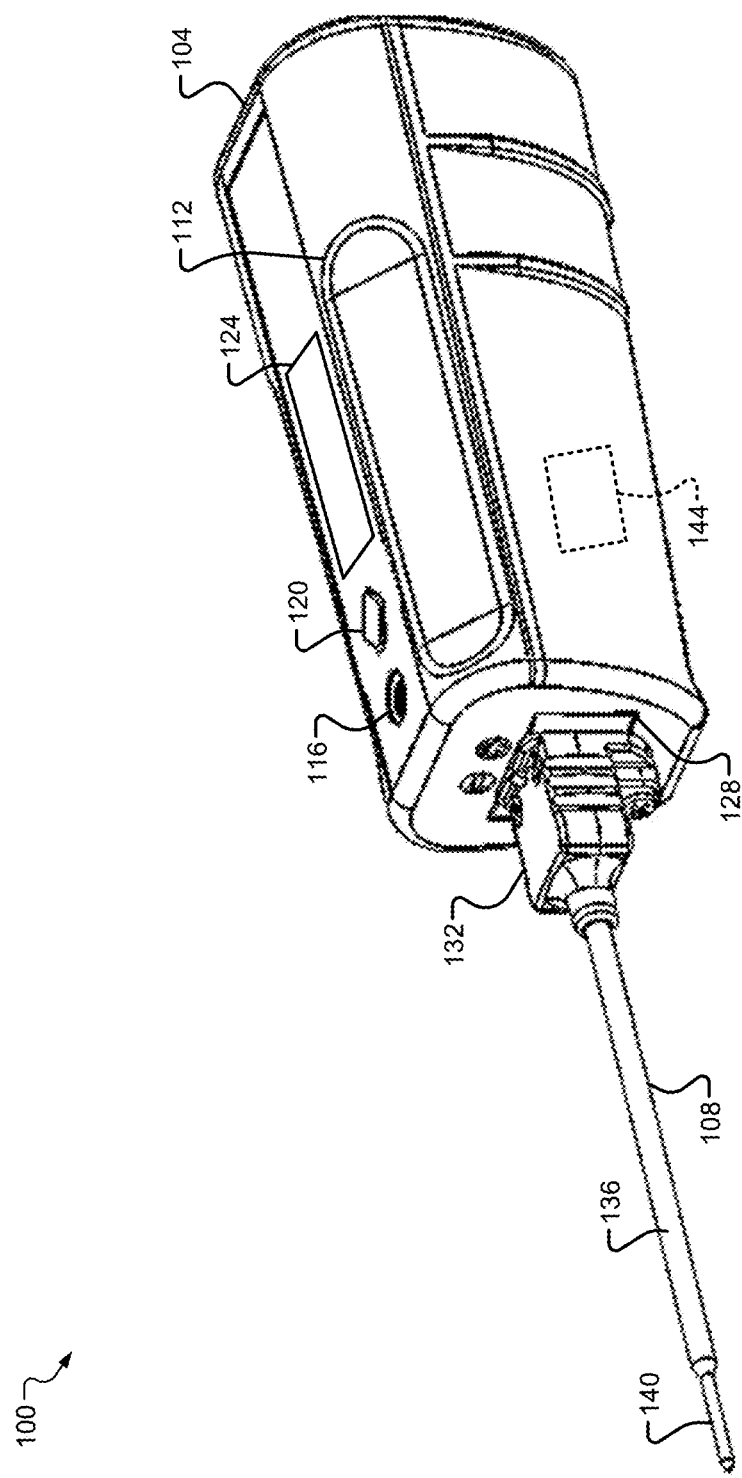
FIG. 1 is a perspective view of an example thermocouple system.

Referring now to FIG. 1, a perspective view of an example thermocouple system 100 is presented. The thermocouple system 100 is used to measure temperature. The thermocouple system 100 may be used in the food service industry, for example, to measure internal temperature of food or to measure temperature of equipment surfaces. Monitoring the internal temperature of food may help determine whether the food has been cooked properly and ensure proper food safety and food quality. The thermocouple system 100 may also be used in other suitable industries, such as pharmaceutical, oil and gas, power generation, etc. For example, in the pharmaceutical industry, it may be important to monitor temperature of drugs because the effectiveness of some drugs decreases with exposure to cold and heat.

While a thermocouple system is shown and will be described, the present disclosure is also applicable to thermistor systems, resistance temperature detector (RTD) systems, thermometer systems, and other types of temperature measuring systems.

The thermocouple system 100 includes a measurement instrument 104 and a temperature probe 108. The measurement instrument 104 includes a grip 112 that allows a user to grasp onto the measurement instrument 104 securely. A status indicator 116 (e.g., light emitting diode (LED) or incandescent bulb) indicates a status of the measurement instrument 104. For example, the status indicator 116 may illuminate green to indicate that the measurement instrument 104 is powered on. The status indicator 116 may, for example, illuminate blue when the measurement instrument 104 is ready to take a temperature measurement via the temperature probe 108. The temperature measurement is a measurement reading of temperature of a sample (e.g., food, surface of equipment, etc.).

When the measurement instrument 104 is ready, the user may insert the temperature probe 108 into the sample or place it on a surface of the sample. The user may depress a button 120 to take the temperature measurement. The temperature measurement may be displayed on a display 124, such as a touchscreen, a liquid crystal display (LCD), etc. Additionally or alternatively, the temperature measurement may be displayed on a smart device, such as a smartphone, a tablet, etc. The measurement instrument 104 may communicate with the smart device using, for example, Bluetooth protocol or Bluetooth Low Energy (BLE) protocol that is compliant with the BLE specification, including, for example, version 5 of the BLE specification. The measurement instrument 104 may be powered with a DC power source (e.g., battery).

The measurement instrument 104 includes a first connector 128 that is configured to receive a second connector 132 of the temperature probe 108. The temperature probe 108 includes a shaft 136. The second connector 132 is coupled to a first end of the shaft 136. A tip 140 is coupled to a second end of the shaft 136. The first connector 128 and the second connector 132 are discussed in further detail below with reference to FIGS. 2A-2B and 3A-3B, respectively.

The tip 140 includes a first wire and a second wire that are each made from different alloys. The alloy material varies based on the type of temperature probe used. For example, the first wire may be Nickel-Chromium and the second wire may be Nickel-Aluminum for a type-K temperature probe. The first and second wires may be electrically connected, forming a junction in the tip 140 of the temperature probe 108. The junction may be formed, for example, by welding the first and second wires together and potting them in a thermally conductive potting.

The temperature measurement of the sample is measured at the junction in the tip 140. A voltage is generated based on the temperature experienced at the junction. A control module 144 may be configured to determine the temperature measurement using one or more lookup tables and/or equations that relate the change in voltages to temperature measurements. Voltage may increase as the temperature increases and vice versa. The control module 144 is discussed in further detail below.

Figure 2A:
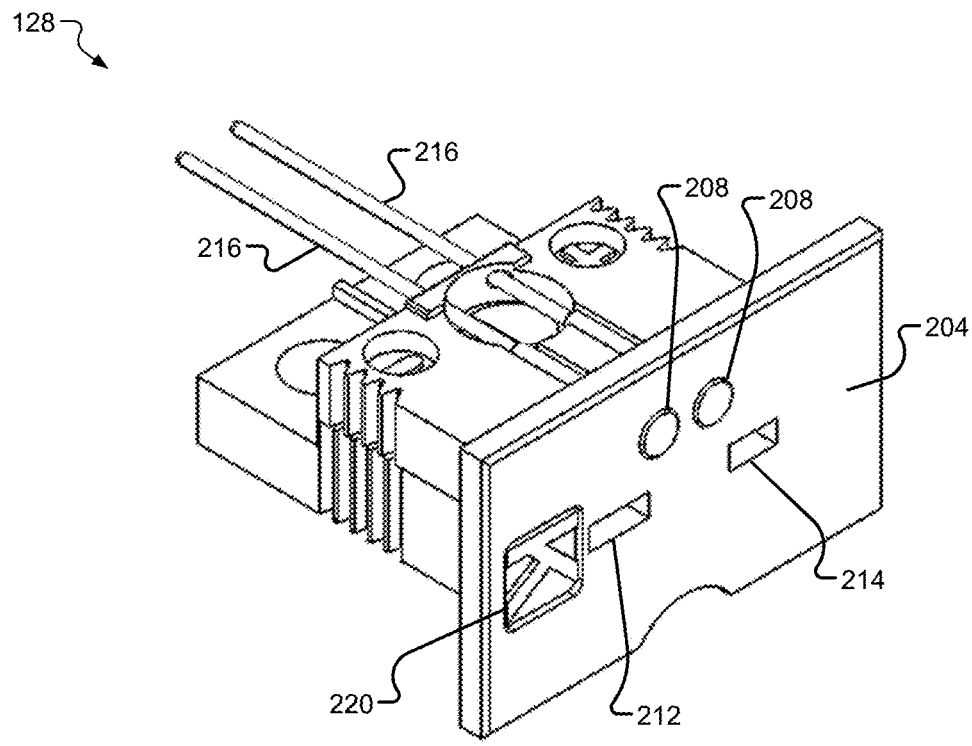
FIG. 2A is a perspective view of an example first connector.
Figure 2B:
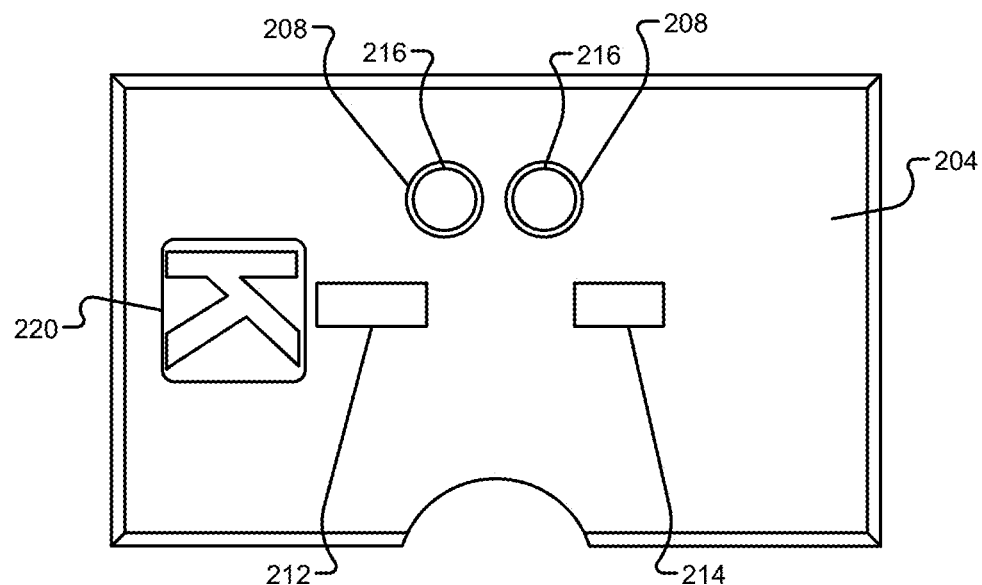
FIG. 2B is a front view of an example first connector.

Referring now to FIGS. 2A and 2B, a perspective view and front view of an example first connector 128 is presented, respectively. The first connector 128 has a first surface 204 having a pair of apertures 208, a first slot 212, and a second slot 214. The first connector 128 is received in a recess such that the first surface 204 of the first connector 128 is flush with the measurement instrument 104. The first connector 128 is fixedly coupled to the measurement instrument 104. The first connector 128 may be a female type connector.

The pair of apertures 208 extend from the first surface 204 of the first connector 128 through the length of the first connector 128. A pair of terminals 216 are disposed within the pair of apertures 208. The pair of terminals 216 extend from the first surface 204 of the first connector 128 to the control module 144. The pair of terminals 216 are electrically connected (e.g., by solder) to the control module 144. The pair of terminals 216 are configured to transmit signals and electrical power between the measurement instrument 104 and the temperature probe 108. The pair of terminals 216 may be made from alloy, for example, copper alloy, silver alloy, or other suitable electrically conductive materials.

The first slot 212 and the second slot 214 extend from the first surface 204 of the first connector 128 through the length of the first connector 128. The first slot 212 may be a different size than the second slot 214. For example, the first slot 212 may be wider than the second slot 214. The first slot 212 may be a different size than the second slot 214 so that the user does not improperly connect the temperature probe 108 to the measurement instrument 104. Although the first slot 212 is shown and discussed as having a different size than the second slot 214, the first slot 212 and the second slot 214 may be the same size.

The first surface 204 of the first connector 128 may include a visual indicator 220 to indicate to the user the type of temperature probe (e.g., type-K, type-J, type-T, type-E, etc.) that may be received by the measurement instrument 104 (via the first connector 128). For example, in the example of FIGS. 2A and 2B, the visual indicator 220 indicates that the measurement instrument 104 (via the first connector 128) receives a type-K temperature probe. The visual indicator 220 may be recessed within the first surface 204 of the first connector 128. Although the visual indicator 220 is shown and discussed as indicating the type-K temperature probe, the visual indicator 220 may indicate a type-J, type-T, type-E, or another suitable temperature probe type, such as a thermistor, RTD, etc.

Figure 3A:
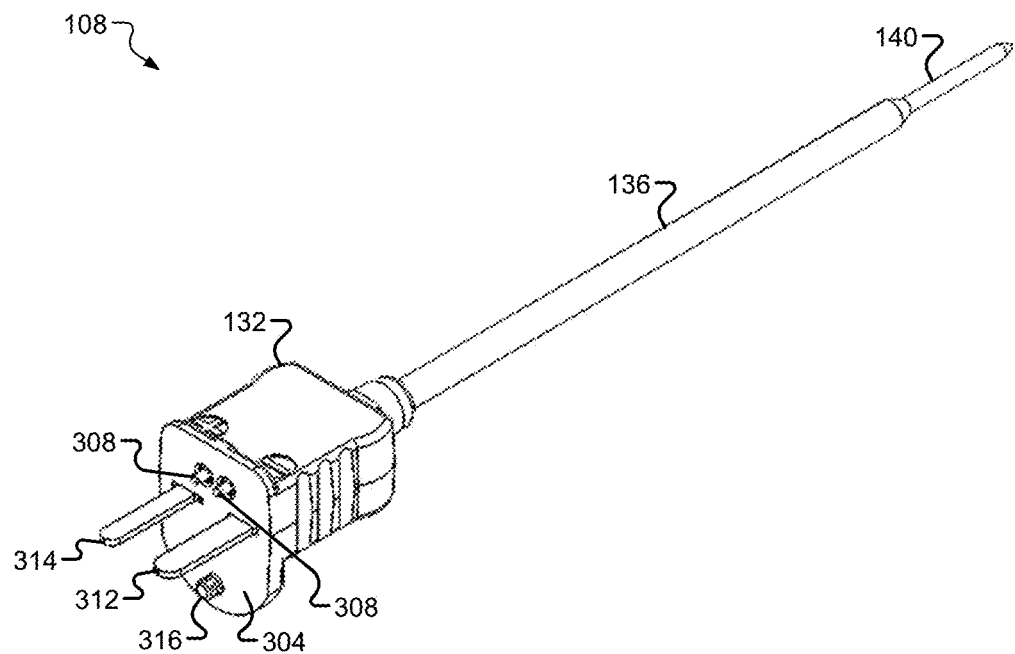
FIG. 3A is a perspective view of an example temperature probe.

Referring now to FIG. 3A, a perspective view of an example temperature probe 108 is presented. The second connector 132 has a second surface 304 having a pair of pin connectors 308 protruding from the second surface 304. The pair of pin connectors 308 are configured to transmit signals and electrical power between the measurement instrument 104 and the temperature probe 108. The pair of pin connectors 308 may be made from alloy, for example, copper alloy, silver alloy, or other suitable electrically conductive materials. The pair of pin connectors 308 may be spring-loaded allowing the pair of pin connectors 308 to be in an extended position, a compressed position, or any position between the extended and compressed positions. The pair of pin connectors 308 may be in the extended position when the second connector 132 is not connected to the first connector 128. The pin connectors 308 may be in the compressed position when the second connector 132 is connected to the first connector 128.

The second connector 132 may also include a first spade connector 312 and a second spade connector 314. The first and second wires extend from the junction in the tip 140 (through the shaft 136) to the second connector 132. The first spade connector 312 may be coupled to the first wire and the second spade connector 314 may be coupled to the second wire. The first spade connector 312 and the second spade connector 314 protrude from the second surface 304 of the second connector 132. The first spade connector 312 and the second spade connector 314 may be made from alloy, for example, corresponding to the material types used in the corresponding type of temperature probe. For example, the first spade connector 312 may be Nickel-Chromium and the second spade connector 314 may be Nickel-Aluminum for a type-K temperature probe. When the second connector 132 is connected to the first connector 128, the first spade connector 312 is received within the first slot 212, the second spade connector 314 is received within the second slot 214, and the pair of pin connectors 308 are coupled to the pair of terminals 216. The first spade connector 312 and the second spade connector 314 are configured to transmit signals and electrical power between the measurement instrument 104 and the temperature probe 108.

The temperature probe 108 (via the second connector 132) may be fastened to the measurement instrument 104 with a fastener 316, such as a screw or clip. The fastener 316 securely holds the temperature probe 108 in place (with the measurement instrument 104) as the user may insert and remove the temperature probe 108 from the sample (e.g., food). The second connector 132 may be a male type connector.

A temperature probe may have an accuracy tolerance. The temperature probe may be manufactured by various manufactures and must follow American National Standards Institute (ANSI) standards. According to ANSI standards, the temperature probe may have a standard limit accuracy tolerance and a special limit accuracy tolerance. The type of wires used (e.g., first wire and second wire) to form a junction in a tip of the temperature probe determines the standard limit accuracy tolerance and special limit accuracy tolerance. For example, the standard limit accuracy tolerance may be determined when standard grade wires (e.g., first wire and second wire) are used to form the junction. Additionally, the special limit accuracy tolerance may be determined when higher grade wires (e.g., first wire and second wire) are used to form the junction. The standard limit accuracy tolerance and special limit accuracy tolerance vary based on the type of temperature probe used. For example, the standard limit accuracy tolerance of a type-K temperature probe is plus or minus (±) 4 degrees Fahrenheit (° F.). The special limit accuracy tolerance, for example, of a type-K temperature probe is ±2° F.

A measurement instrument may also have an accuracy tolerance. The accuracy tolerance of the temperature probe and the accuracy tolerance of the measurement instrument may collectively be referred to as system accuracy. The system accuracy may be determined, for example, by adding the accuracy tolerance of the temperature probe to the accuracy tolerance of the measurement instrument. For example, a temperature probe having an accuracy tolerance of ±2° F. and a measurement instrument having an accuracy tolerance of ±0.5° F. may have a system accuracy of ±2.5° F.

Each temperature probe may have an offset value that is within the accuracy tolerance of the temperature probe. The offset value may be determined based on empirical data derived at a factory. For example, the offset value may be a difference between a first observed temperature measurement and an expected temperature measurement. To prevent inaccurate temperature measurements, the measurement instrument may be calibrated based on the offset value of the temperature probe. For example, if it is determined that a temperature probe has an offset value of +1° F., the measurement instrument may be calibrated with a −1° F. value at the factory to compensate for the offset value of the temperature probe.

As the temperature probe degrades over time, the user may replace the original temperature probe with a replacement temperature probe. The replacement temperature probe may have a different offset value than the original temperature probe (that was calibrated with the measurement instrument) and the user may not have the equipment necessary to recalibrate the measurement instrument with the offset value of the replacement temperature probe. As such, the temperature measurement (e.g., with the replacement probe) may vary by an amount that is greater than an allowable threshold suitable for use in the food service industry, which may be, for example, a tolerance of ±2° F.

For example, if an original temperature probe has an offset value of −4° F., the measurement instrument may be calibrated with a +4° F. value to compensate for the offset value at the factory. When the original temperature probe is replaced with a replacement temperature probe that has an offset value of +4° F. (and the user may not have the equipment necessary to recalibrate the measurement instrument with the offset value of the replacement probe), the temperature measurement may be inaccurate by up to +8° F. (e.g., +4° F. from the calibrated measurement instrument and +4 from the replacement temperature probe).

Figure 3B:
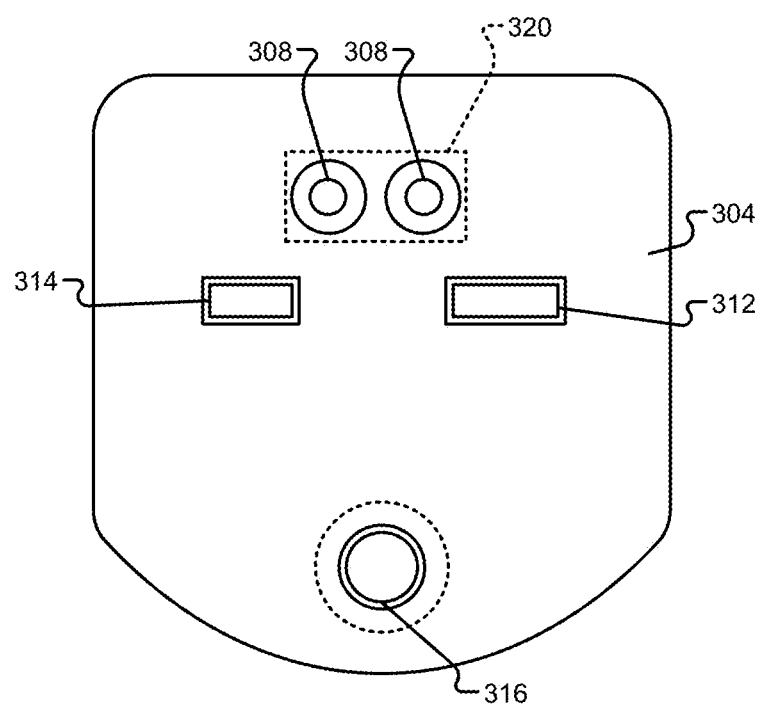
FIG. 3B is a front view of an example second connector.

As such, the offset value of the temperature probe 108 may be stored within the temperature probe 108. Storing the offset value of the temperature probe 108 may prevent inaccurate temperature measurements from being measured by the replacement temperature probe. With reference to FIG. 3B, the offset value of the temperature probe 108 may be stored in a storage module 320. The storage module 320 is housed within the second connector 132 and is electrically connected to the pair of pin connectors 308. The storage module 320 may transmit (via the pair of pin connectors 308 and the pair of terminals 216) the stored offset value of the temperature probe 108 to the control module 144 when the temperature probe 108 is connected to the measurement instrument 104.

Referring now to FIGS. 1 and 3B, the control module 144 is configured to receive the offset value of the temperature probe 108 from the storage module 320. The control module 144 may adjust the temperature measurement based on a first correction value. The control module 144 may determine the first correction value based on a value that is opposite of the offset value. For example, the control module 144 may determine a first correction value of −3° F. if the temperature probe 108 has an offset value of +3° F. The measurement instrument 104 may display the adjusted temperature measurement on the display 124 or on the smart device. The control module 144 may determine the adjusted temperature measurement, for example, by adding the first correction value to the temperature measurement. The adjusted temperature measurement may prevent inaccurate temperature measurements when the temperature probe 108 may be replaced as the temperature probe 108 degrades over time. The control module 144 may include one or more other modules, such as a BLE module to communicate with the smart device.

For example, the control module 144 may determine a temperature measurement of +210° F. at the tip 140. The storage module 320 may store an offset value of −2° F. of the temperature probe 108. The control module 144 may receive the offset value and determine a first correction value of +2° F. The control module 144 may determine an adjusted temperature measurement of +212° F. (by adding the first correction value to the temperature measurement). The adjusted temperature measurement may be displayed on the display 124 or on the smart device.

Figure 4:
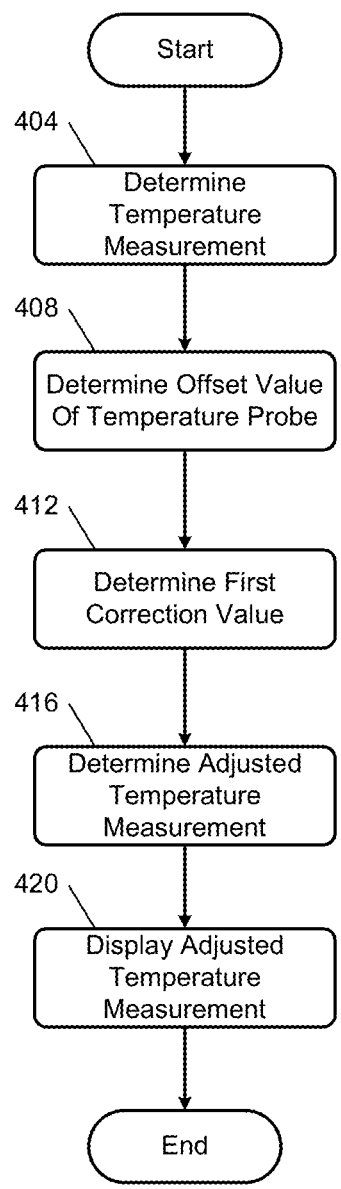
FIG. 4 is a flowchart depicting an example method of adjusting a temperature measurement to prevent inaccurate temperature measurements.

Referring now to FIG. 4, a flowchart depicting an example method of adjusting the temperature measurement to prevent inaccurate temperature measurements is presented. Control begins with 404 where the control module 144 determines the temperature measurement. At 408, the control module 144 receives and determines the offset value of the temperature probe 108 from the storage module 320. At 412, the control module 144 determines the first correction value. At 416, the control module 144 determines the adjusted temperature measurement. At 420, the measurement instrument 104 may display the adjusted temperature measurement on the display 124 or on the smart device. While control is shown and discussed as ending, the example of FIG. 4 may be illustrative of one control loop and control may return to 404.

Under some circumstances, an offset value of a temperature probe may vary over time based on factors, such as aging of a junction, and/or if the temperature probe may have been exposed to temperatures outside of an operational range. The aging of the junction may be, for example, determined based on a usage period of the temperature probe. The offset value that may have been stored in a storage module may be adjusted (e.g., updated) to compensate for the variation in the offset value over time. As such, the useful life of the temperature probe may be extended.

Referring back to FIGS. 1 and 3B, in various implementations, the adjusted offset value may be stored in the storage module 320. The adjusted offset value may replace the offset value. The adjusted offset value may be determined based on empirical data derived at the factory. For example, the adjusted offset value may be a difference between a second observed temperature measurement and the expected temperature measurement.

For example, as the offset value of the temperature probe 108 may vary over time, the user may send the temperature probe 108 to the factory. The adjusted offset value may be determined based on the difference between the second observed temperature measurement and the expected temperature measurement. The adjusted offset value may replace the offset value and be stored in the storage module 320 of the temperature probe 108. The factory may send the temperature probe 108 back to the user. When the temperature probe 108 is connected to the measurement instrument 104 to take the temperature measurement, the control module 144 receives the adjusted offset value from the storage module 320. The control module 144 determines the adjusted temperature measurement based on the adjusted offset value instead of the offset value.

Under some circumstances, a user of a thermocouple system may not wait long enough for a temperature measurement to reach a stable temperature, causing an inaccurate temperature measurement to be taken. Under some circumstances, the user may wait too long before determining that the temperature measurement has reached the stable temperature, causing an unnecessary delay. The stable temperature is an indication that a tip is able to maintain a consistent voltage (indicative of a consistent temperature measurement) of a sample (e.g., food or surface of environment). As such, a thermocouple system may optimize a period before displaying the temperature measurement (e.g., stable temperature).

In various implementations, the storage module 320 may be configured to store a response time of the temperature probe 108. The storage module 320 may transmit the response time of the temperature probe 108 to the control module 144 (via the pair of pin connectors 308 and the pair of terminals 216). The response time of the temperature probe 108 is the period it takes the junction to respond to the change in voltage in the tip 140. The response time of the temperature probe 108 may be determined based on factors, such as placement of the junction in the tip 140, size of the tip 140, size of the shaft 136, material of the tip 140 and/or thermal conductivity of the potting used. The response time of the temperature probe 108 may improve (e.g., quicker response time) as the junction moves closer to the surface of the tip 140 and vice versa.

The control module 144 may be configured to store thermal conductivity of the sample. The thermal conductivity of the sample is a measure of how quickly heat moves through the sample and may be used to determine an expected period that the sample takes to reach the stable temperature. For example, the thermal conductivity of each meat product (e.g., steak, beef, etc.), poultry (e.g., chicken, turkey, etc.), and fish may be stored on the control module 144. The thermal conductivity of the sample may be determined based on water content of the sample. Thermal conductivity of the sample may improve (e.g., quicker response time) as the water content of the sample increases and vice versa.

The control module 144 may receive the response time of the temperature probe 108 from the storage module 320. The control module 144 may determine a stable time of the sample. The stable time of the sample is a period that elapses before indicating to the user that the temperature measurement has reached the stable temperature. For example, the control module 144 may determine the stable time of the sample by a combination of the thermal conductivity of the sample and the response time of the temperature probe 108. The temperature measurement may be displayed on the display 124 after a period greater than or equal to the stable time has elapsed after the temperature probe 108 has been inserted into the sample (indicative of a stable temperature). Additionally or alternatively, the status indicator 116 may illuminate (e.g., red) to indicate to the user that the sample has not reached a stable temperature until a period greater than or equal to the stable time has elapsed after the temperature probe 108 has been inserted into the sample (indicative of a stable temperature).

For example, when the user is ready to take the temperature measurement of the sample, the user may be prompted by the display 124 to select the sample that may have been stored in the control module 144. Once the user selects the sample, the control module 144 may determine the thermal conductivity of the sample. The control module 144 may receive the response time of the temperature probe 108 from the storage module 320. The control module 144 may determine the stable time by, for example, using the combination of the thermal conductivity of the sample and the response time of the temperature probe 108. The temperature probe 108 may be inserted into the sample or placed on the surface of the sample. The temperature measurement may be displayed on the display 124 after a period greater than or equal to the stable time has elapsed after the temperature probe 108 has been inserted into the sample (indicative of a stable temperature). Additionally or alternatively, the status indicator 116 may illuminate (e.g., red) until a period greater than or equal to the stable time has elapsed after the temperature probe 108 has been interested into the sample (indicative of a stable temperature).

Figure 5:
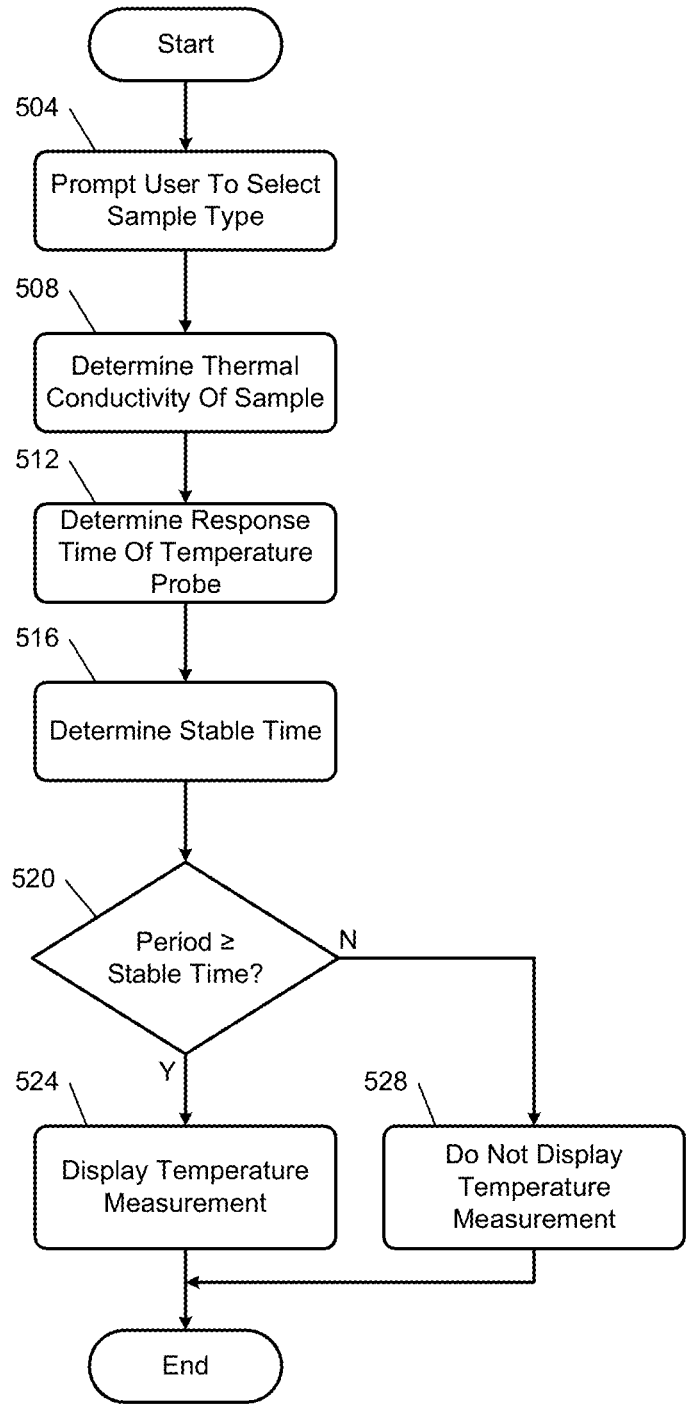
FIG. 5 is a flowchart depicting an example method of determining when a temperature measurement is stable.

Referring now to FIG. 5, a flowchart depicting an example method of determining when the temperature measurement is stable is presented. Control begins with 504 where the display 124 may prompt the user to select the sample type. At 508, the control module 144 determines the thermal conductivity of the sample that the user selected. At 512, the control module 144 receives and determines the response time of the temperature probe 108 from the storage module 320.

At 516, the control module 144 may determine the stable time. At 520, the control module 144 may determine whether a period greater than or equal to the stable time has elapsed. If 520 is true, the measurement instrument 104 may display the temperature measurement on the display 124 or on the smart device at 524. If 520 is false, the measurement instrument 104 (via the display 124) and/or the smart device does not display the temperature measurement. While control is shown and discussed as ending, the example of FIG. 5 may be illustrative of one control loop and control may return to 504, or 520, or to another suitable step in the flowchart.

Under some circumstances, an identification (ID) label may be attached to a thermocouple system. The ID label may include a physical serial number and/or an optically recognizable identifier (e.g., barcode corresponding to the physical serial number). A record that associates a particular temperature measurement to the thermocouple system (e.g., serial number) may need to be maintained for management audits or equipment traceability. The information on the ID label may be recorded by hand, on a computer, or by a handheld electronic device (e.g., including a scanner) if a record must be maintained.

Referring back to FIGS. 1 and 3B, in various implementations, the storage module 320 may store a unique identifier (e.g., serial number) of the temperature probe 108. The storage module 320 may transmit the unique identifier to the control module 144 (via the pair of pin connectors 308 and the pair of terminals 216). When the control module 144 determines the temperature measurement, the unique identifier of the temperature probe 108 may be stored with the corresponding temperature measurement in the control module 144. Storing the unique identifier with the corresponding temperature measurement may increase accuracy of equipment traceability and decrease record keeping by the user.

While the example of a storage module comprising one or more parameters including at least one of an offset value, an adjusted offset value, a response time, and a unique identifier of a temperature probe of a thermocouple system is shown and discussed, the present disclosure is applicable to a storage module comprising one or more parameters of other types of probes housed within the respective other types of probes. For example, the other types of probes include thermistor probes, RTD probes, etc.

Figure 6:
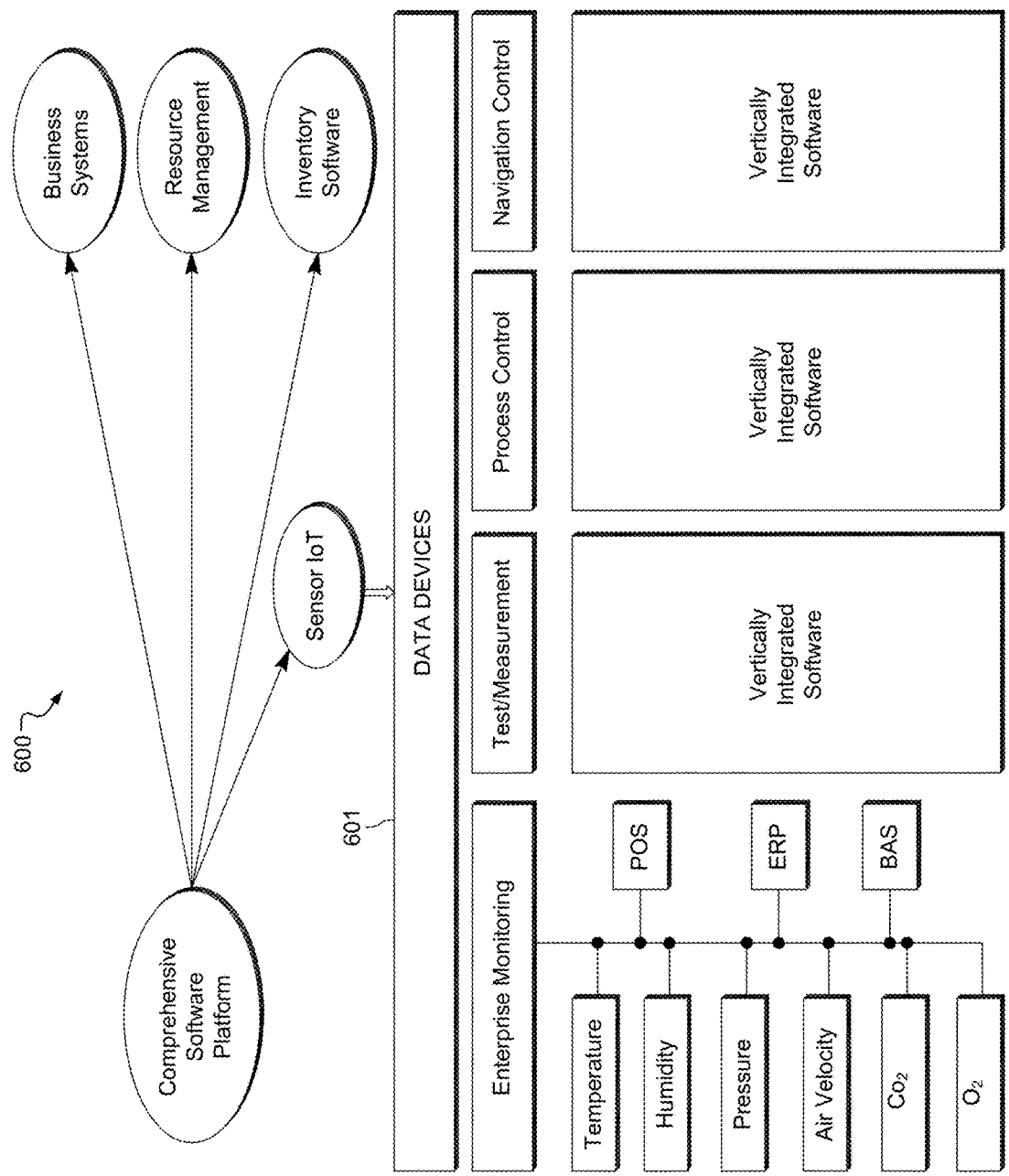
FIG. 6 is a block diagram of a comprehensive software platform.

Referring now to FIG. 6, a block diagram 600 of a comprehensive software platform is presented. The comprehensive software platform receives data from multiple sources including internet of things (IoT) devices 601. The IoT may include enterprise monitoring, test/measurement, process control, navigation control, kitchen equipment or other types of equipment typically used in the food service industry. Enterprise monitoring includes point of sale (POS), enterprise resource planning (ERP), and billing automation system (BAS) as well as building automation systems.

Figure 7:
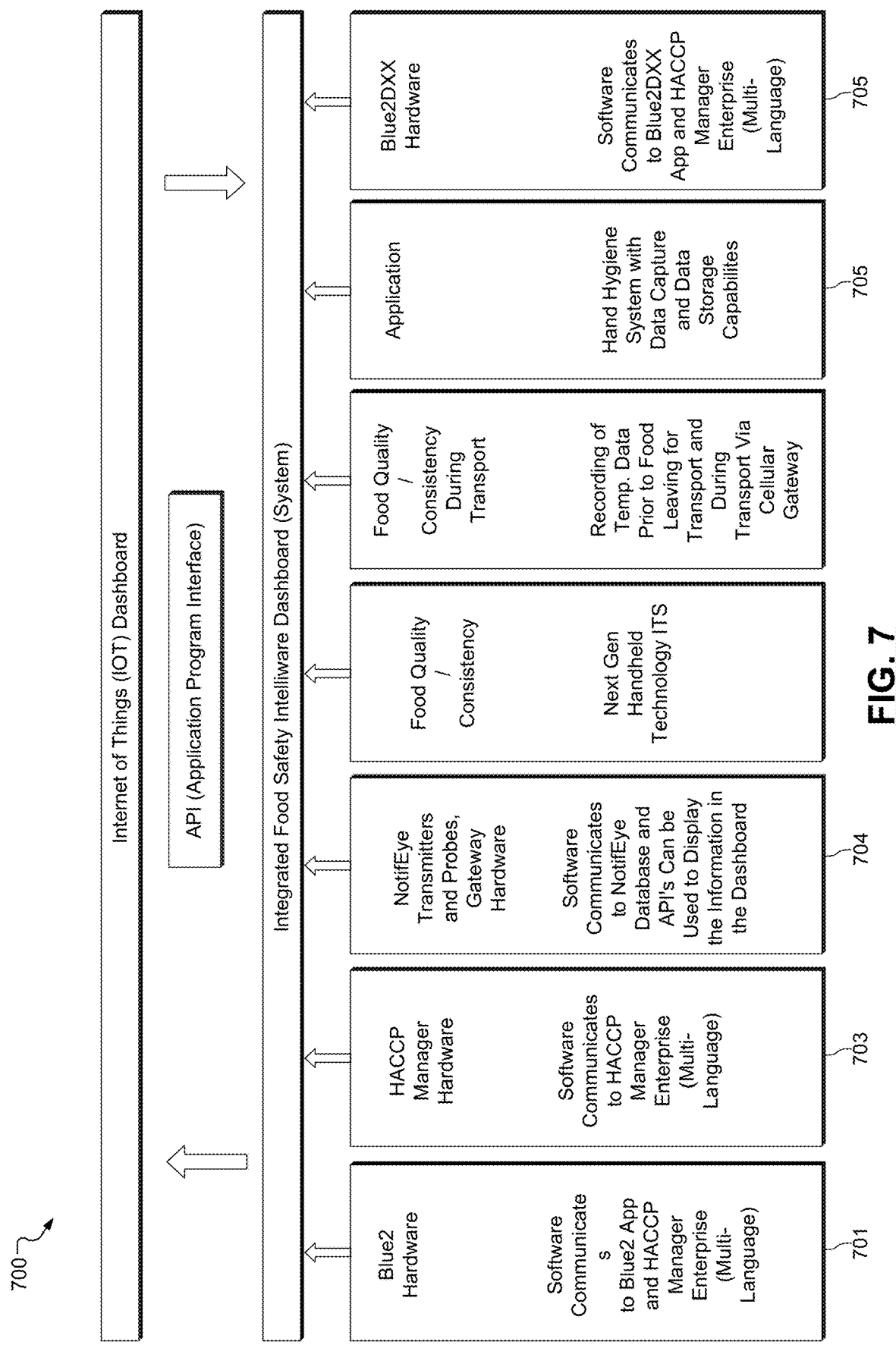
FIG. 7 is a block diagram of an Integrated Food Safety Intelliware Dashboard.

Referring now to FIG. 7, a block diagram 700 of an Integrated Food Safety Intelliware Dashboard is presented. The Integrated Food Safety Intelliware Dashboard may be referred to as a dashboard. The dashboard integrates data received from one or more sources, such as from Blue2 hardware 701, Blue2DXX hardware 702, Hazard Analysis and Critical Control Points (HACCP) Manager hardware 703, and NotifEye hardware 704. An application program interface (API) provides the ability to pass information to and from other systems which may be on-site or remote. A user interface is provided by the dashboard or potentially, a customized user interface may be created utilizing the API. The API communicates with the IoT. The IoT may send and receive data to and from the API.

The dashboard may be used by several different users within an organization. For example, an operational employee might use the dashboard to check on temperatures of the food being prepared across several pieces of equipment or to ensure that certain processes are followed (e.g., instructions for checking and recording that work instructions are completed). An operational manager may utilize the dashboard to preconfigure certain kitchen operations and processes for employees to follow or to check the status of a particular piece of equipment. The manger may also utilize the dashboard to provide metrics of how the kitchen is running similar to the way a plant manager uses information from various factory floor equipment to ensure that overall operation is optimized.

The Blue2 hardware 701 and the Blue2DXX hardware 702 may receive a temperature probe, such as temperature probe 108. The Blue2 hardware 701 and the Blue2DXX hardware 702 communicate with a smart device and the smart device communicates with the dashboard via HACCP Manager Enterprise 703. For example, the dashboard may receive a temperature measurement measured by the temperature probe. The HACCP Manager hardware 703 may be a handheld device that allows the user to take temperature measurements based on a predetermined schedule and a predetermined route. Temperature measurements are transmitted to the dashboard via HACCP Manager Enterprise. The NotifEye hardware 704 includes transmitters and probes that monitor and transmit temperature measurements, humidity measurements, and door contact information (e.g., whether a door is open or closed) to the dashboard. The NotifEye hardware 704 communicates to the dashboard wirelessly using 900 Megahertz (MHz).

The dashboard may receive data from an application, such as a Hand Hygiene Monitoring (HHM) system 705. The HHM system 705 determines when a healthcare worker may have been exposed to a patient and may need to rewash their hands. Further details of the HHM system may be found in U.S. Pub. No. 2017/0076056, which is incorporated herein by reference.

Figure 8:
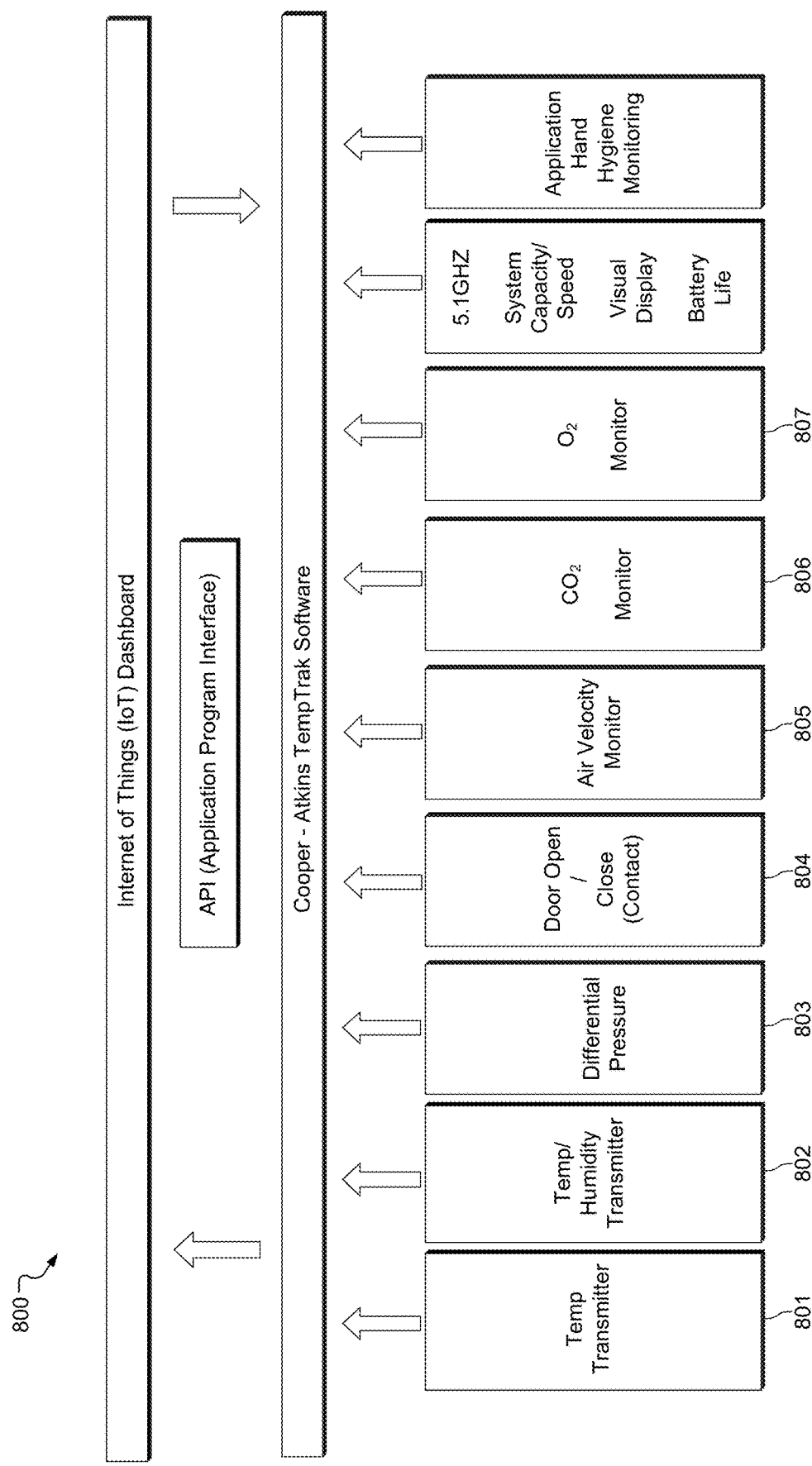
FIG. 8 is a block diagram of a temperature tracking (TempTrak) application.

Referring now to FIG. 8, a block diagram 800 of temperature tracking (TempTrak) application is presented. TempTrak application is a wireless monitoring system that integrates data received from one or more wireless sensors. The user accesses the TempTrak application through an application program interface (API). The API communicates with the IoT. The IoT may send and receive data to and from the API.

The one or more wireless sensors include temperature sensors 801, humidity sensors 802, differential pressure sensors 803, door contact sensors 804, air velocity sensors 805, carbon dioxide sensors 806, or oxygen sensors 807. The one or more wireless sensors may also include a Wi-Fi sensor that operates using, for example, 5.1 gigahertz (GHz) or 2.4 MHz legacy. The Wi-Fi sensor may include a visual display and increase system capacity/speed while improving battery life compared to current wireless sensors.

Referring now to FIGS. 6-8, the dashboard may be implemented using a cloud computing environment. The cloud computing environment may be a cloud service that is configured to allow a user to perform cloud computing operations. As an example, the cloud computing environment may include a plurality of virtual computers that are accessible by an administrator device and/or client devices. In one embodiment, a user of the administrator device may deploy the dashboard via an application streaming service, thereby enabling the client devices to access the dashboard using a web browser.

The cloud computing environment may include one or more processors that are configured to execute instructions stored in a nontransitory computer-readable medium, such as a read-only memory (ROM) and/or a random-access memory (RAM). As an example, the cloud computing environment may be implemented by Amazon Elastic Compute Cloud (EC2) provided by Amazon Web Services®. Alternatively, the cloud computing environment may be implemented by the Google® Compute Engine, Microsoft® Azure, or other similar cloud computing environments.

The user of the administrator device may create and manage templates and any dependencies or runtime parameters associated with the templates, which configure the computing infrastructure of the cloud computing environment. Additionally, the user of the administrator device may deploy and/or update a template and its associated collection of resources by using an API, such as JSON or YAML templates. As an example, the user may deploy and/or update a template using Amazon CloudFormation provided by Amazon Web Services®.

The dashboard may be streamed to the client devices via an HTML5 web browser. As an example, the cloud computing environment may stream, using Amazon AppStream 2.0 provided by Amazon Web Services®, encrypted pixels to the client devices, and the dashboard may be executed using a streaming instance dedicated to the corresponding user to ensure that computing resources are not shared. Therefore, the user of the administrator device can maintain a single, secure, and ubiquitous version of the dashboard that is remotely accessible by many types of client devices.

In some embodiments, the cloud computing environment may include a monitoring service that monitors an amount of computing resources that the administrator device and/or client devices are consuming at a given time. As an example, the monitoring service may measure and provide metrics corresponding to CPU utilization, data transfer, and disk usage activity of the instances generated by the cloud computing environment. The monitoring service may be implemented by Amazon Web Services® CloudWatch.

Furthermore, the cloud computing environment may include a scaling service that scales an amount of computing resources based on a number of active instances. In response to triggering an alarm of the scaling service, the monitoring service may send notifications and/or terminate/create instances based on the scaling policy.

Figure 9:
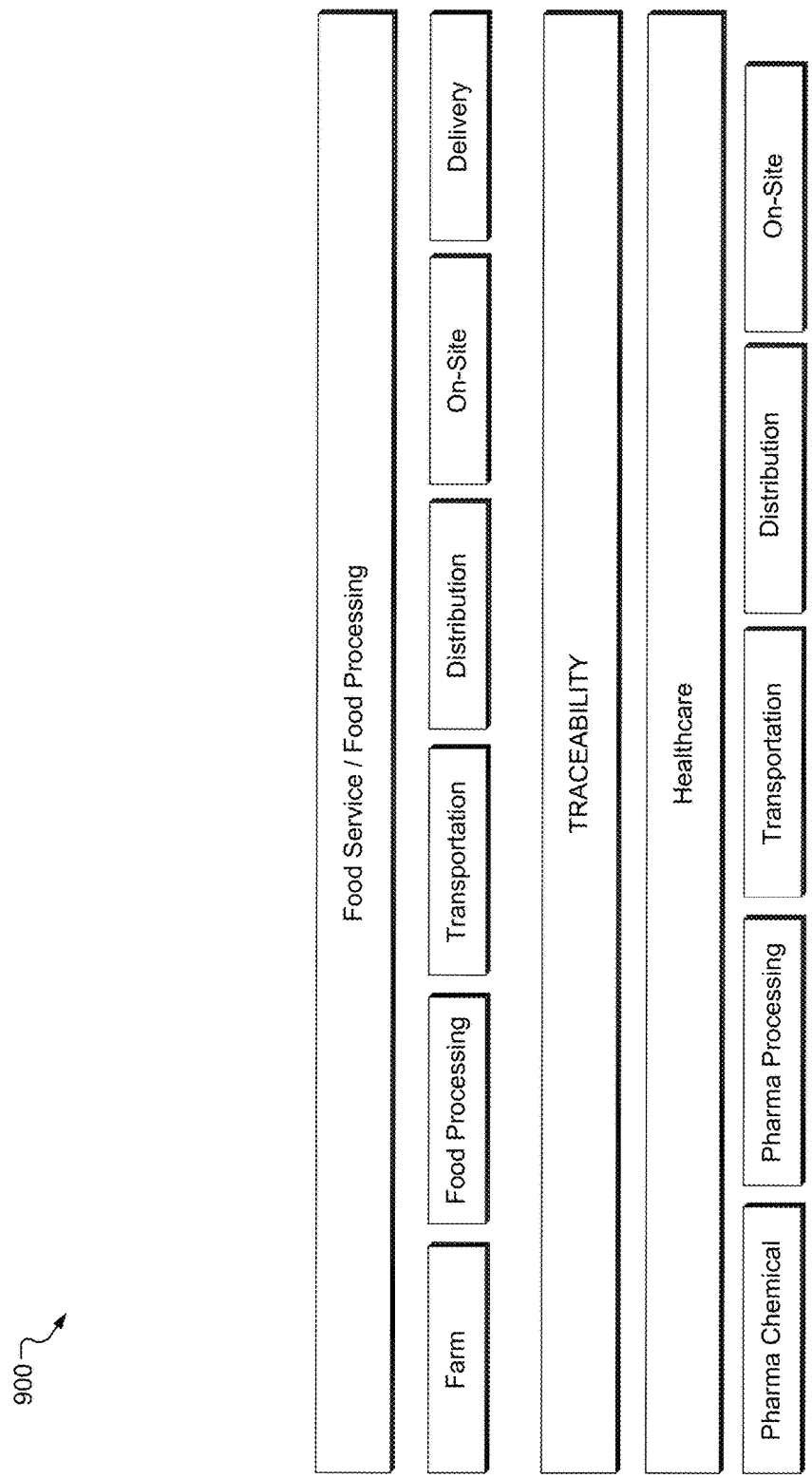
FIG. 9 is a block diagram of various industries that may provide data.
Figure 10:
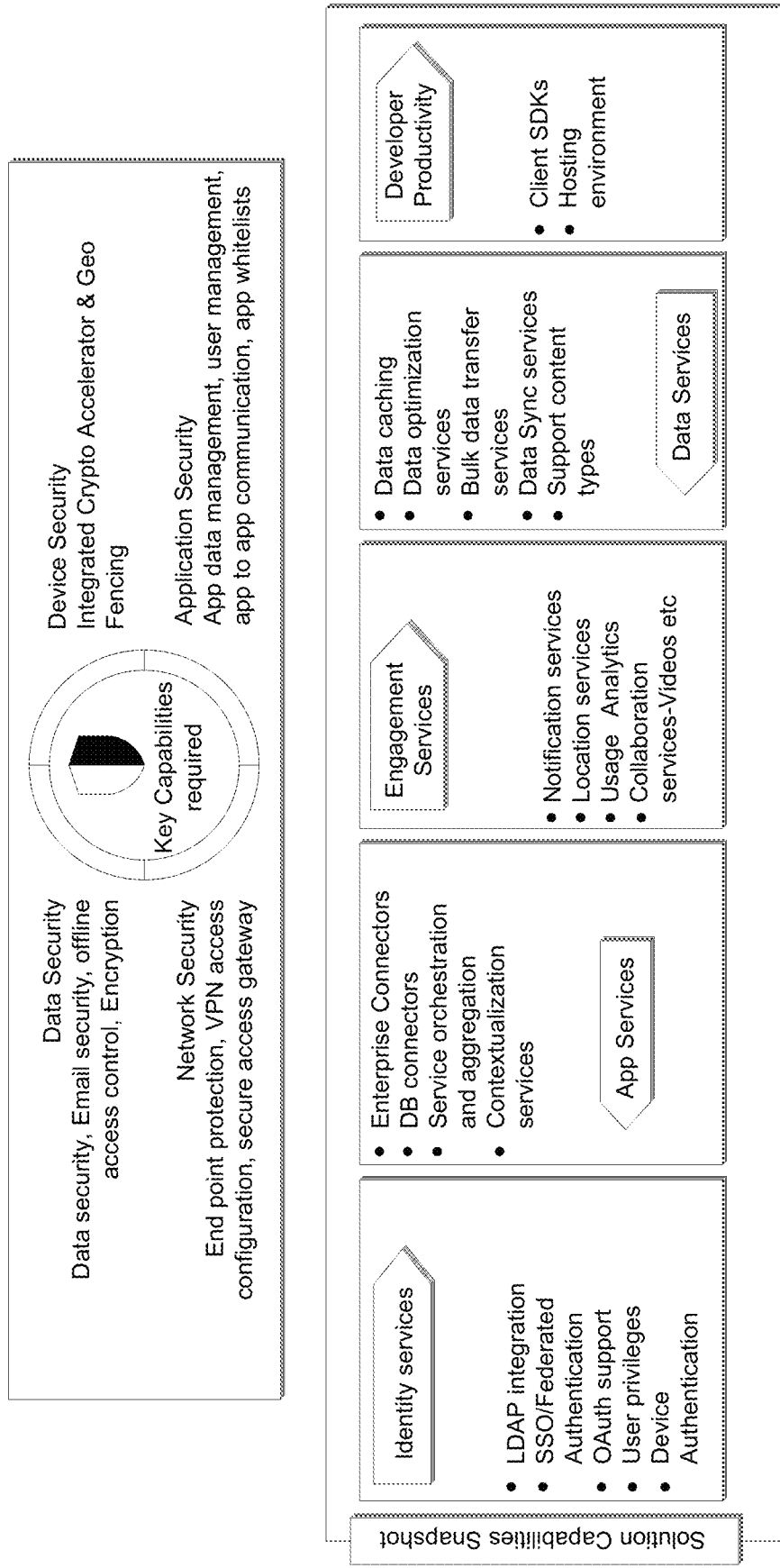
FIG. 10 is a screenshot of an example proposed solution capability and security.
Figure 11:
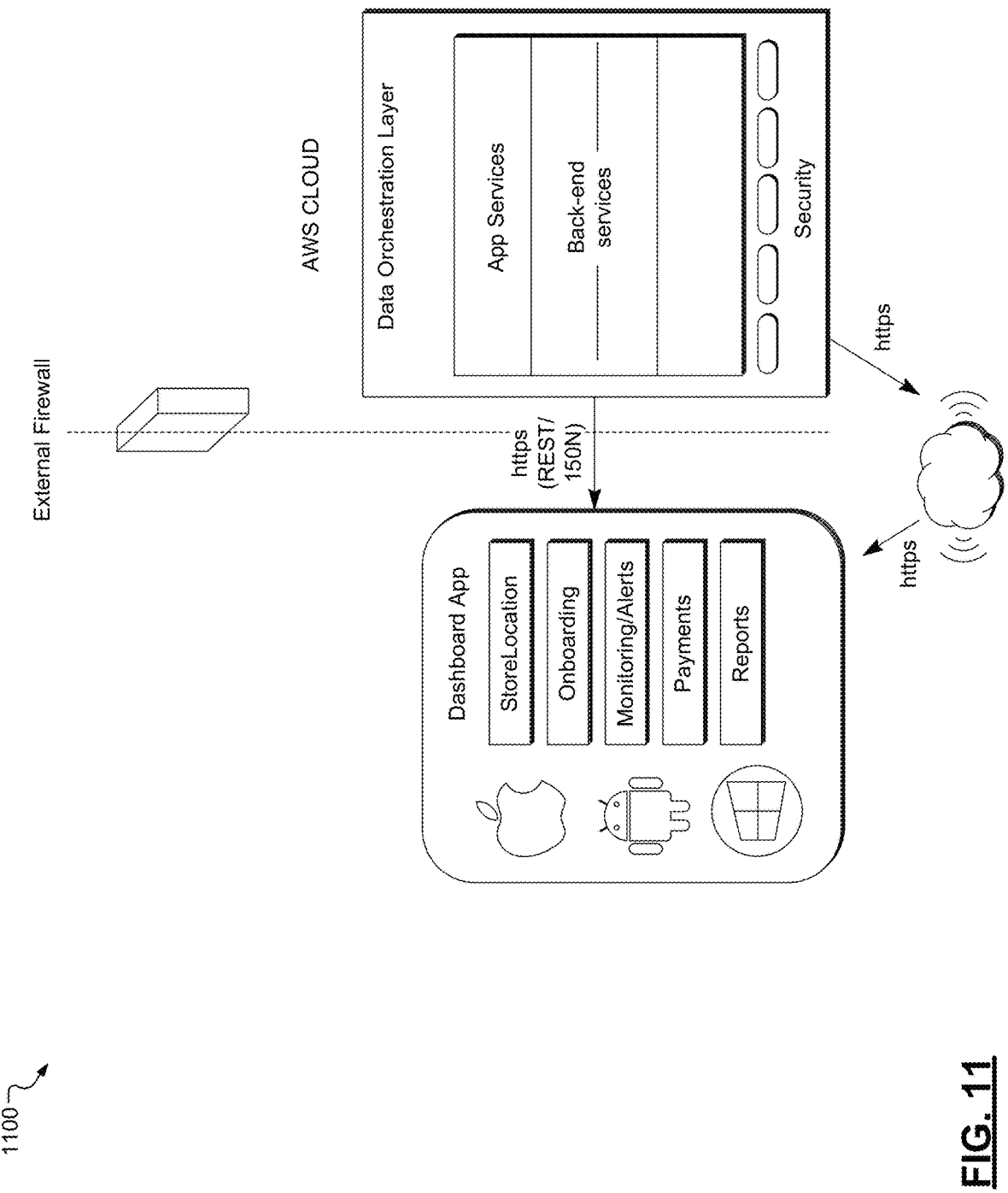
FIG. 11 is a screenshot of an example logical solution.
Figure 13:
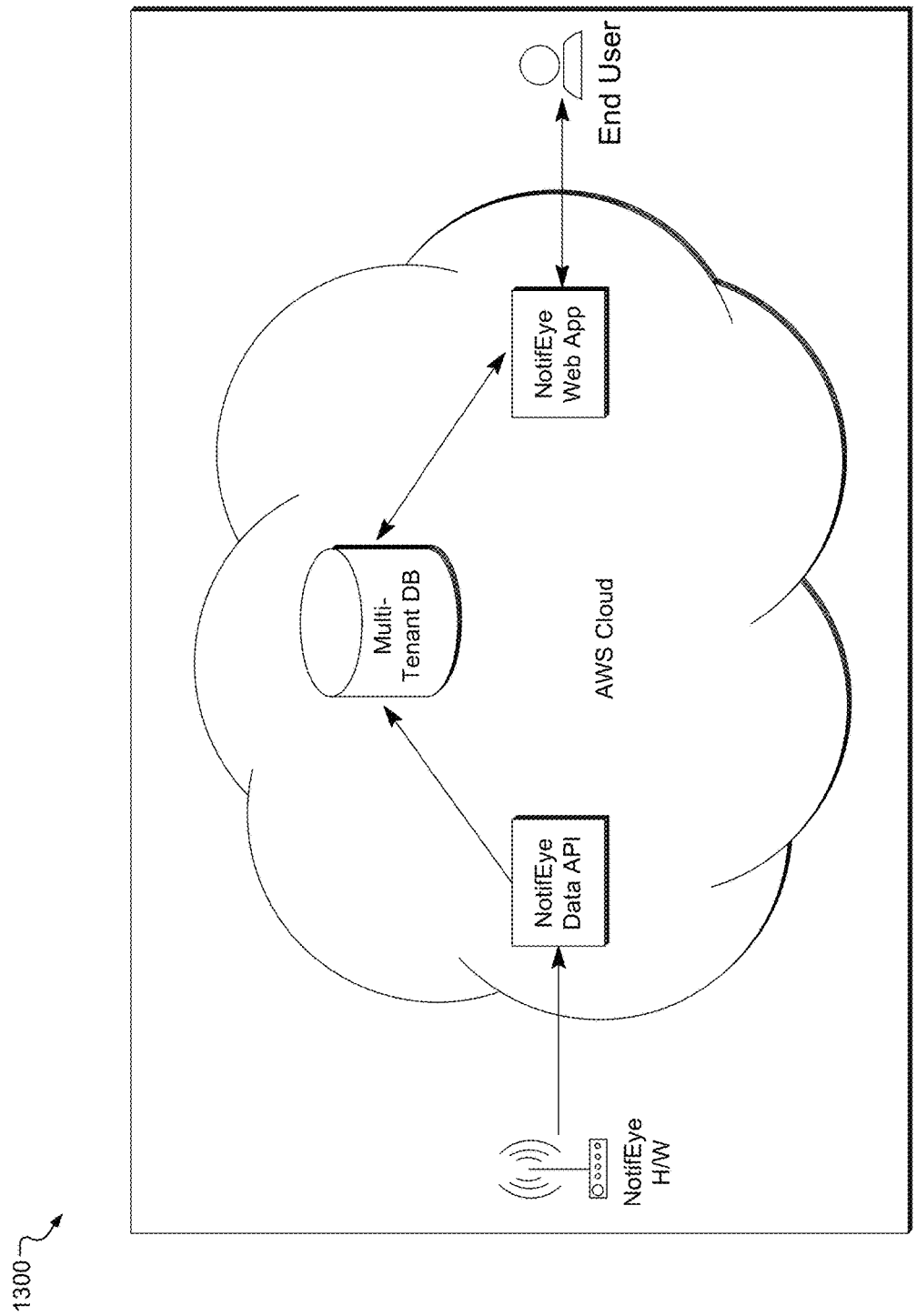
FIG. 13 is a screenshot of an example current architecture.
Figure 14:
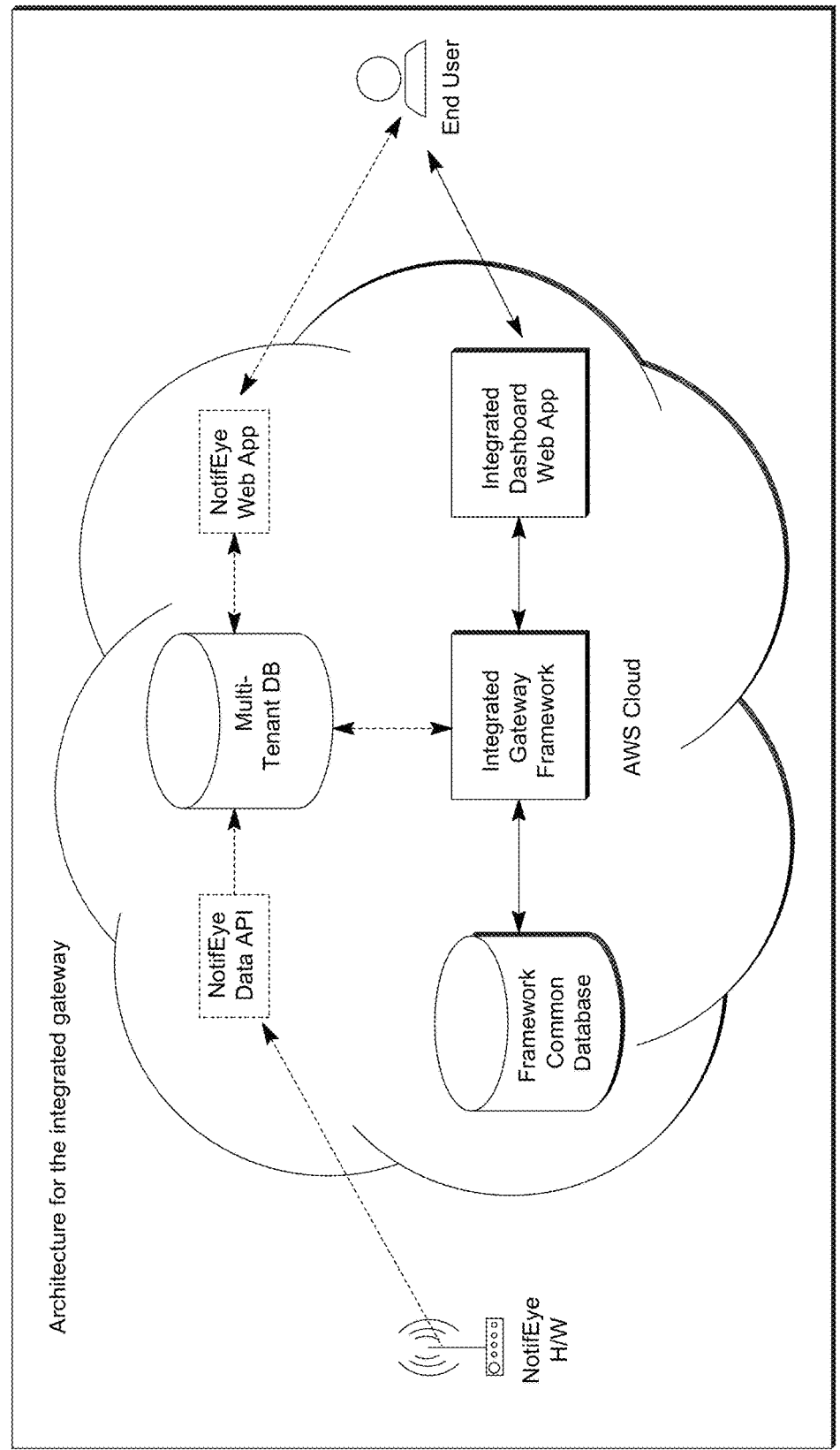
FIG. 14 is a screenshot of an example proposed architecture.
Figure 15:
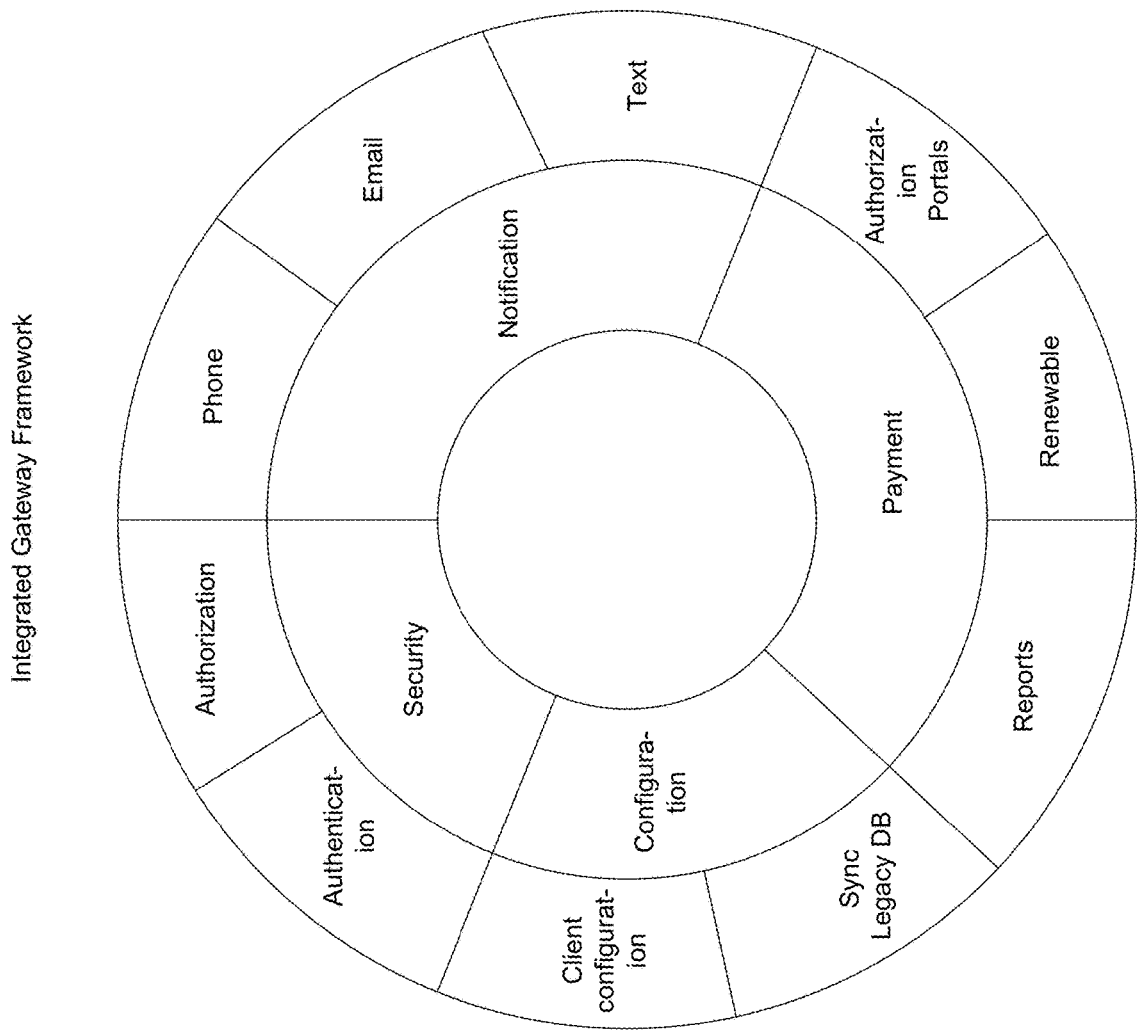
FIG. 15 is a screenshot of an example integrated gateway framework.
Figure 16:
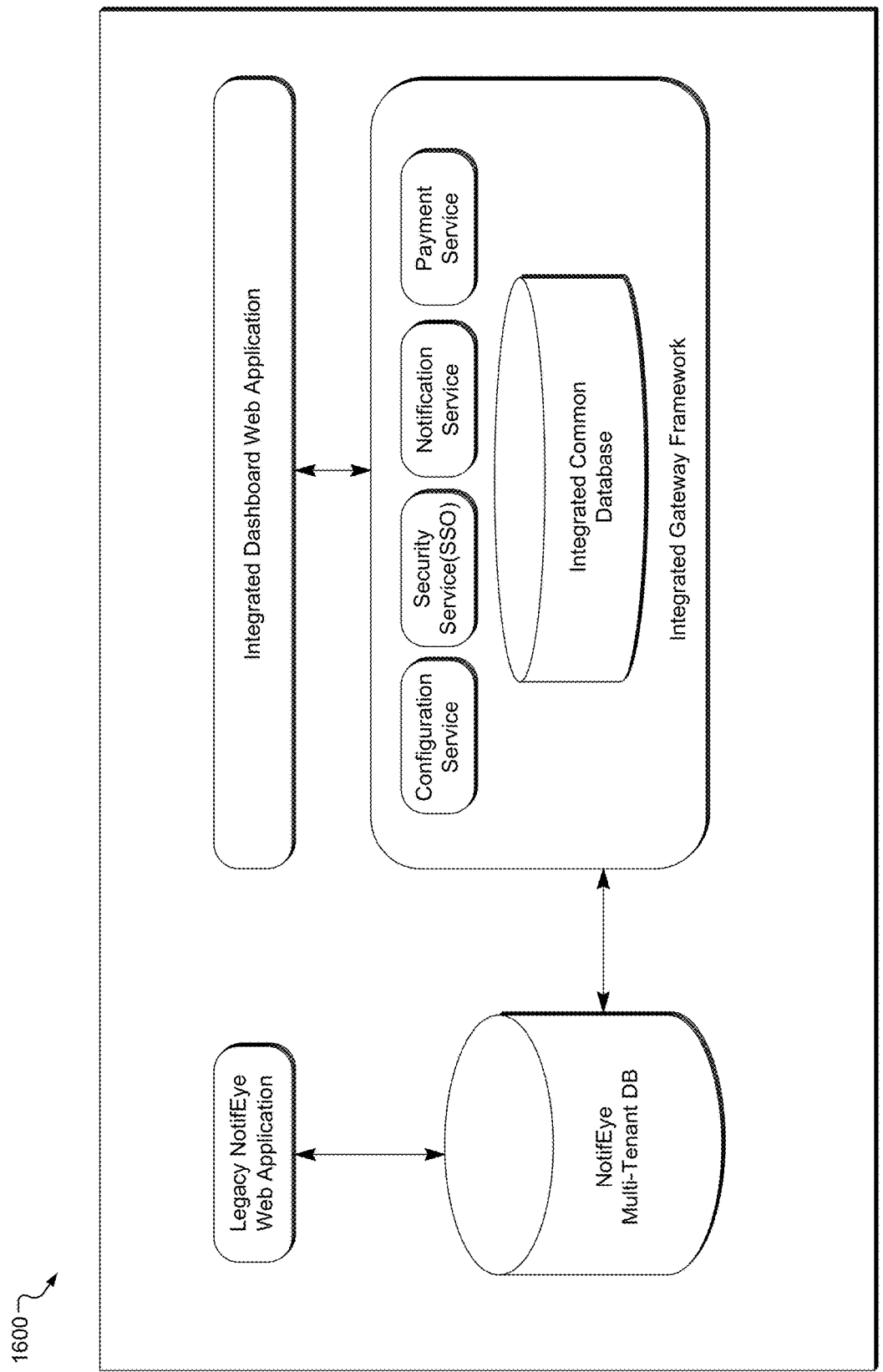
FIG. 16 is a screenshot of another example integrated gateway framework.
Figure 17:
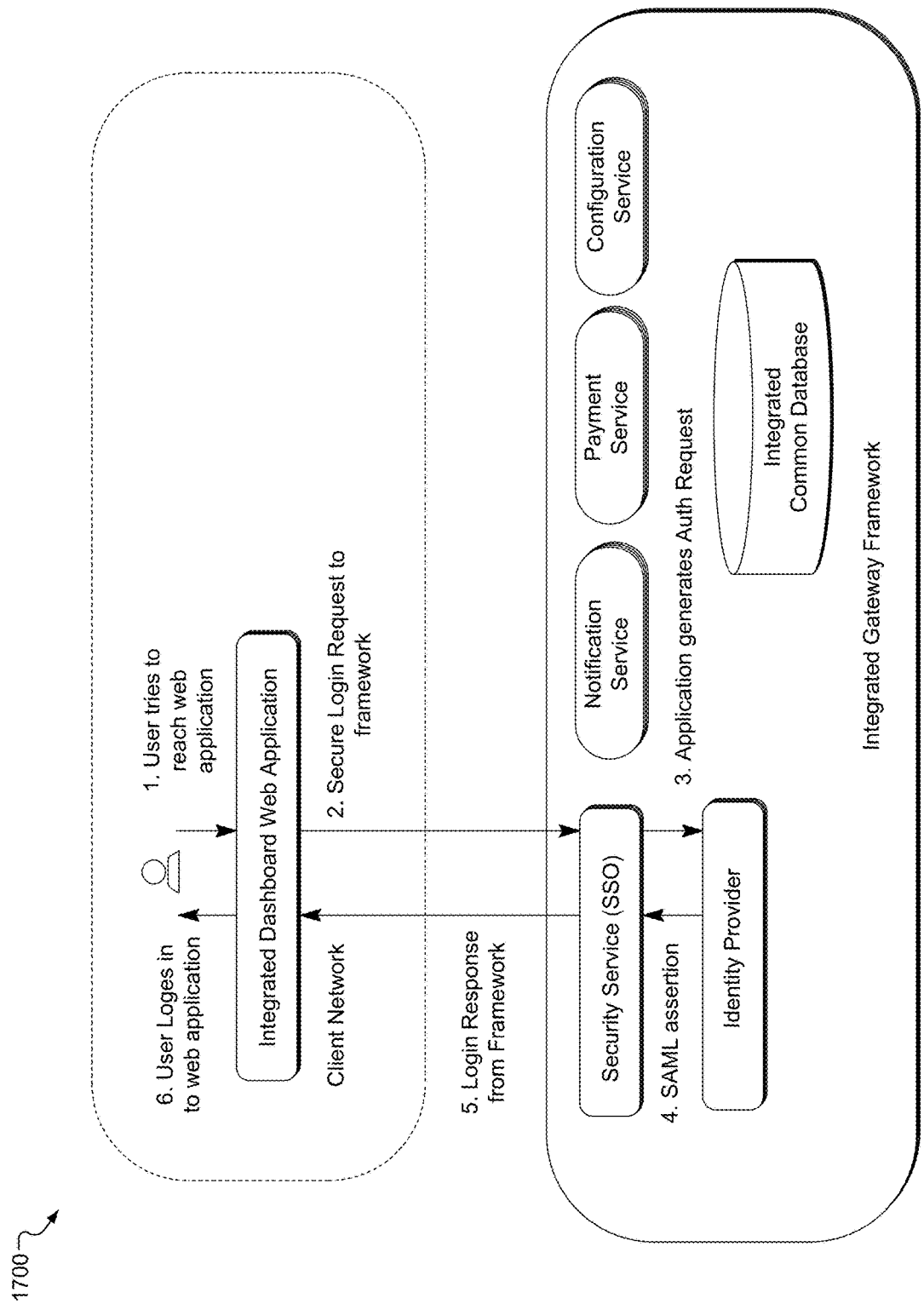
FIG. 17 is a screenshot of an example framework provided to a security service layer.
Figure 18:
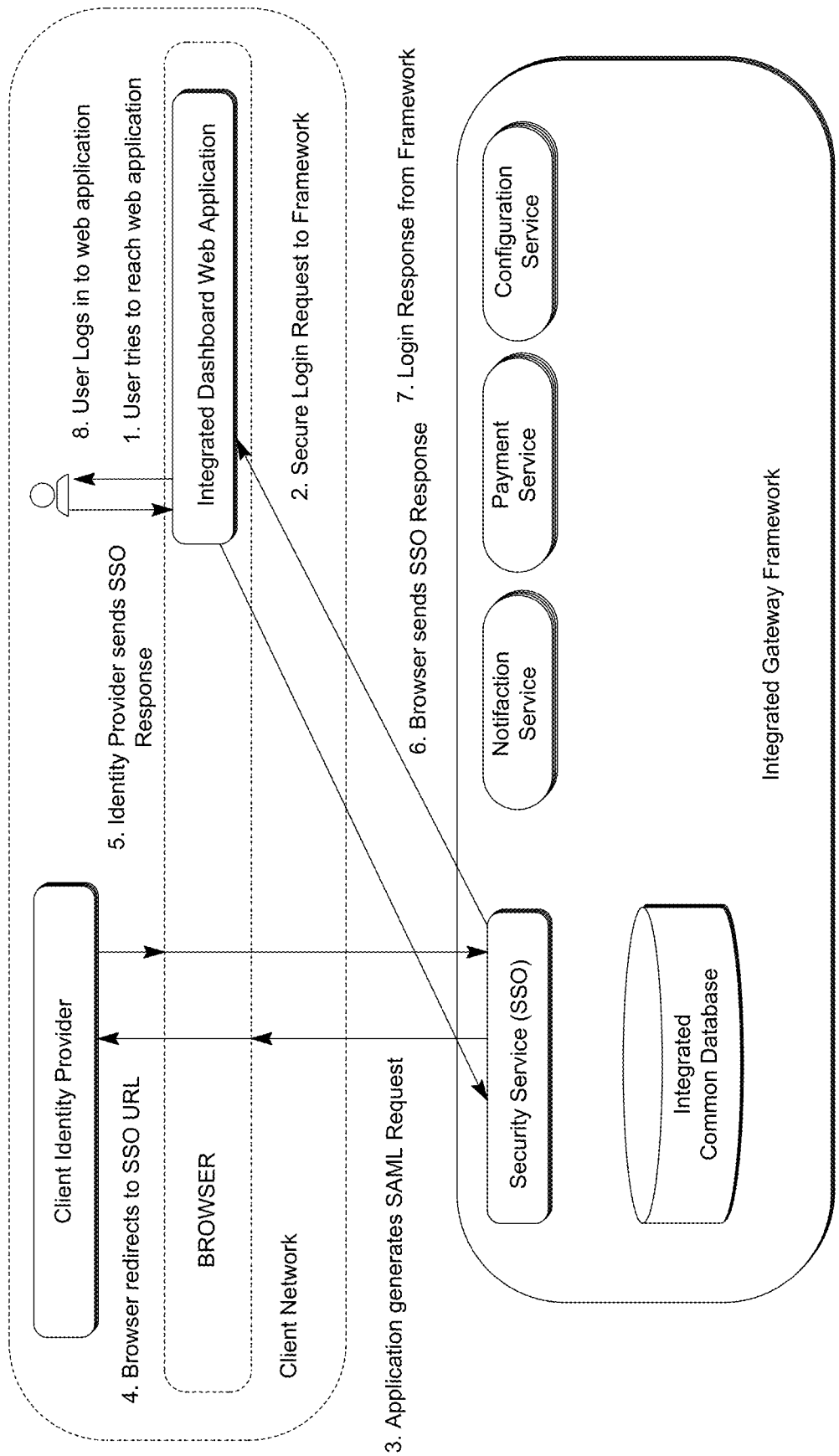
FIG. 18 is a screenshot of an example use client security service provider.
Figure 20:
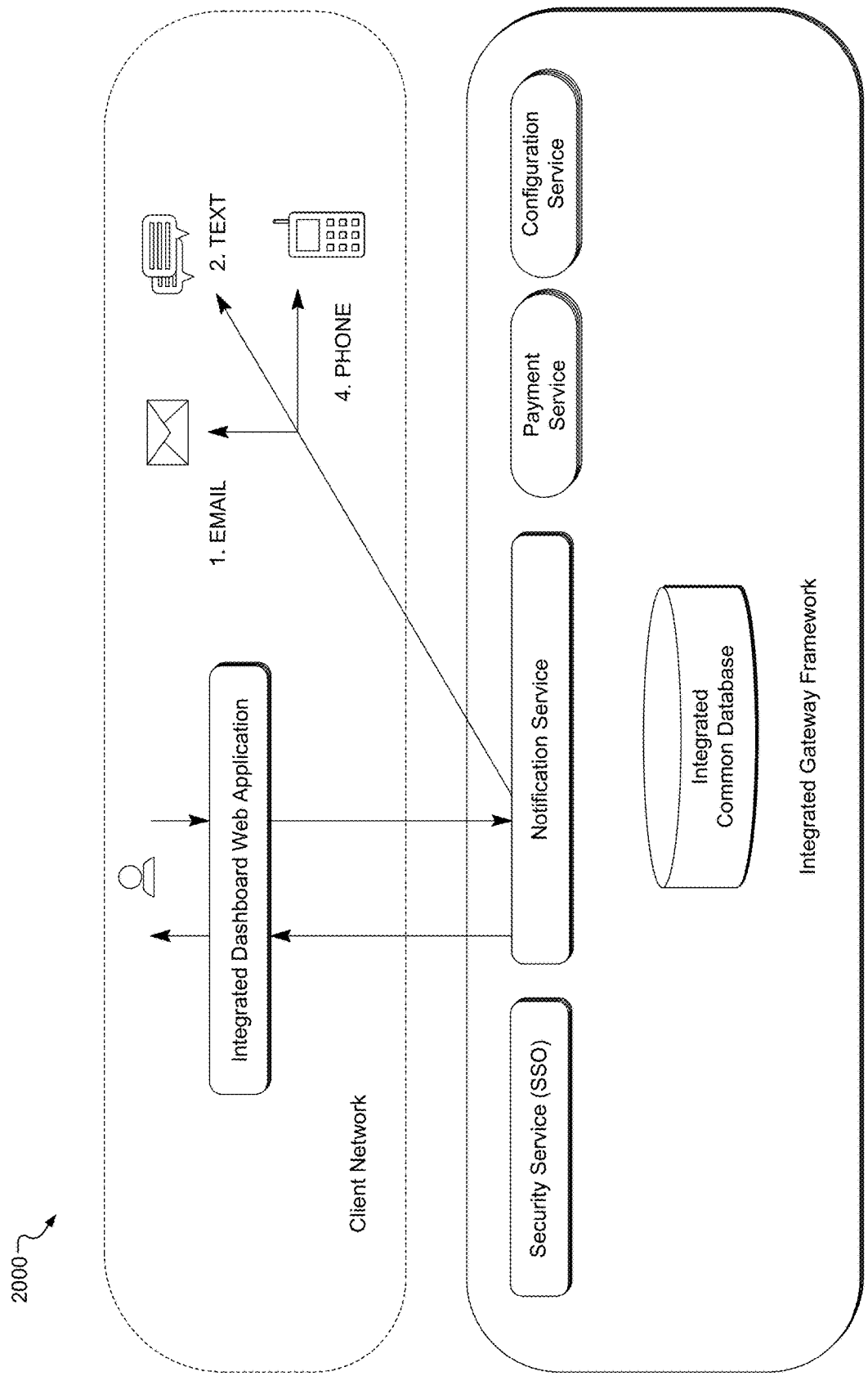
FIG. 20 is a screenshot of an example notification service.
Figure 21:
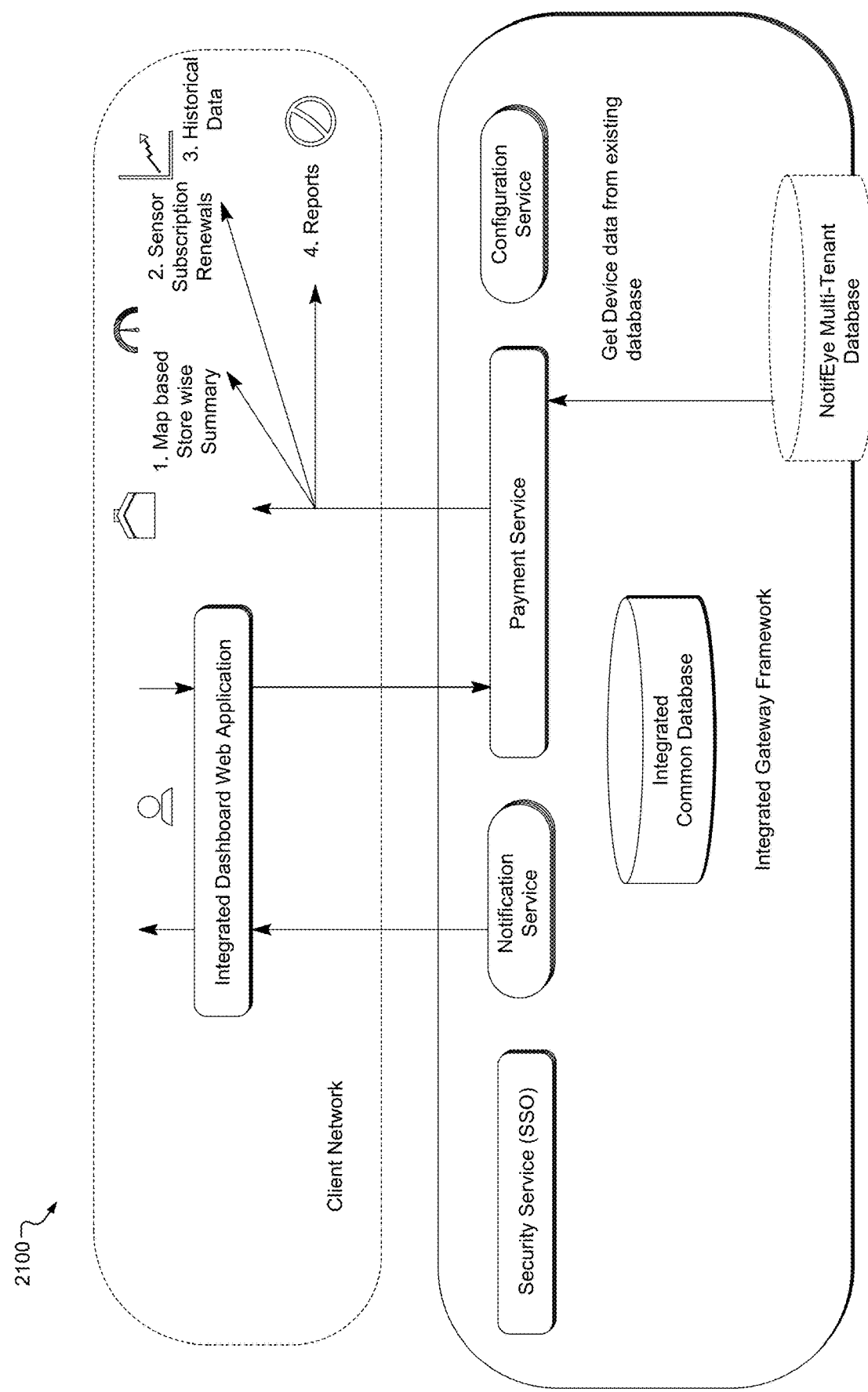
FIG. 21 is a screenshot of an example payment service.
Figure 22:
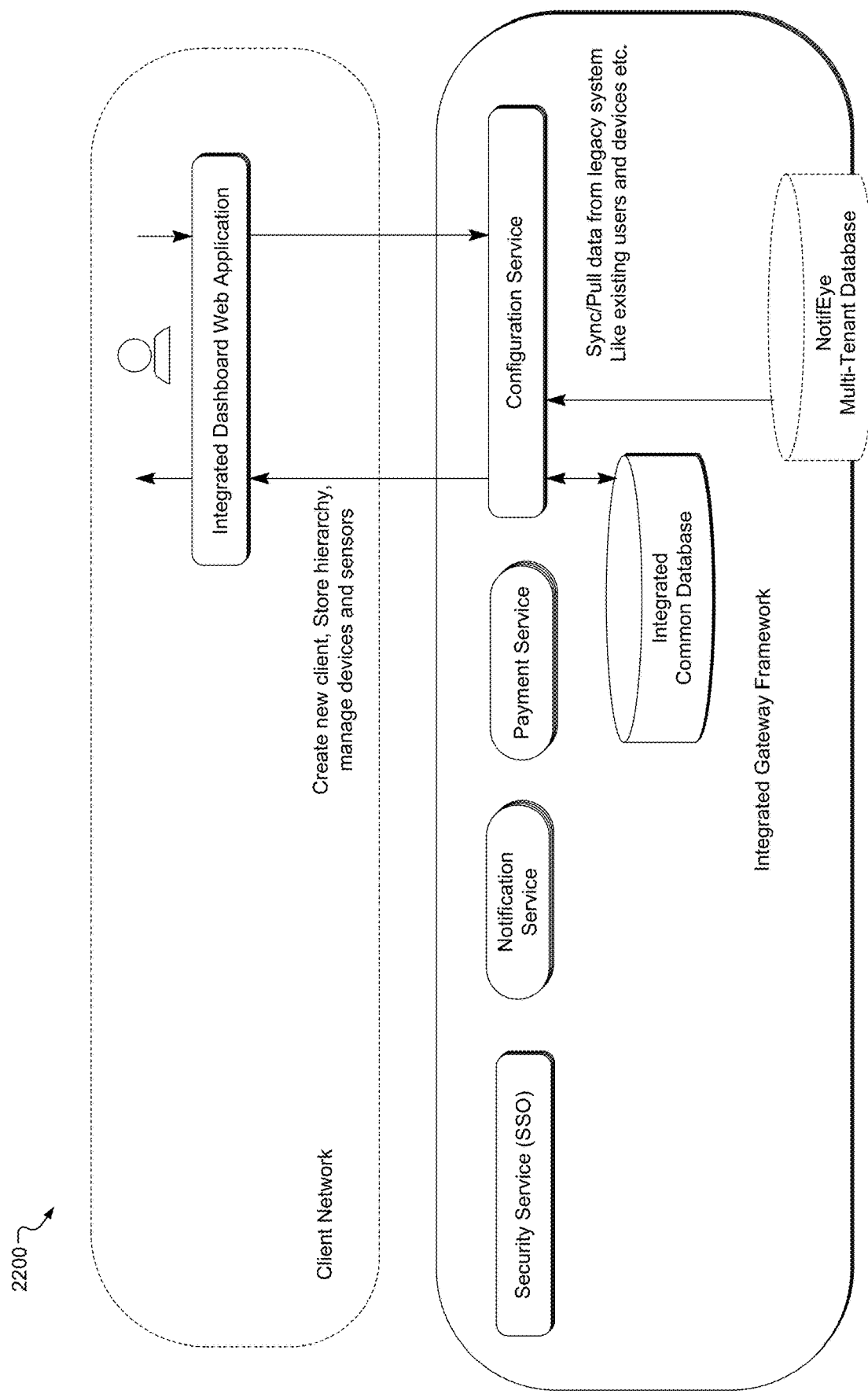
FIG. 22 is a screenshot of an example configuration service.
Figure 23:
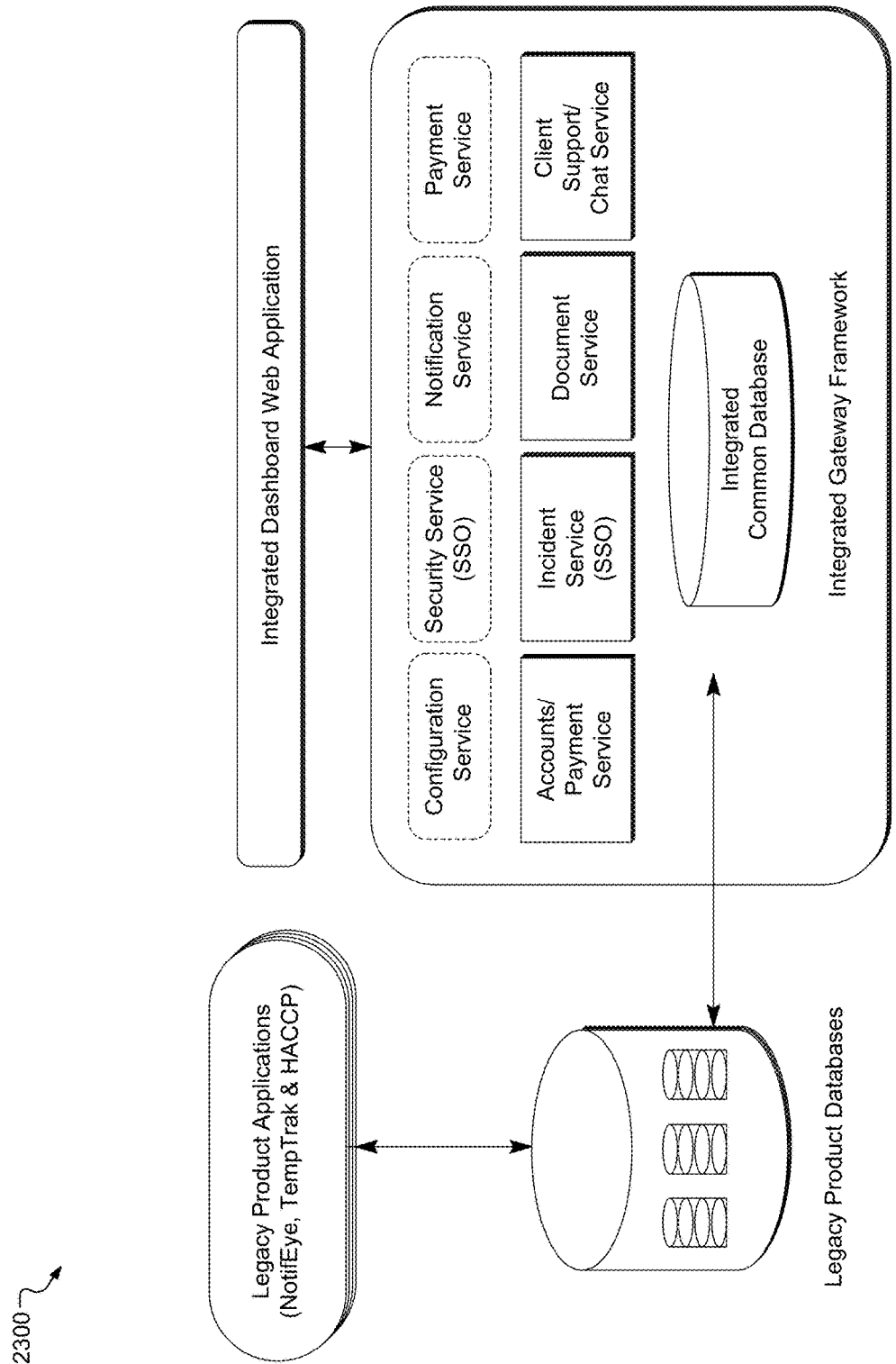
FIG. 23 is a screenshot of another example integrated gateway framework.
Figure 24:
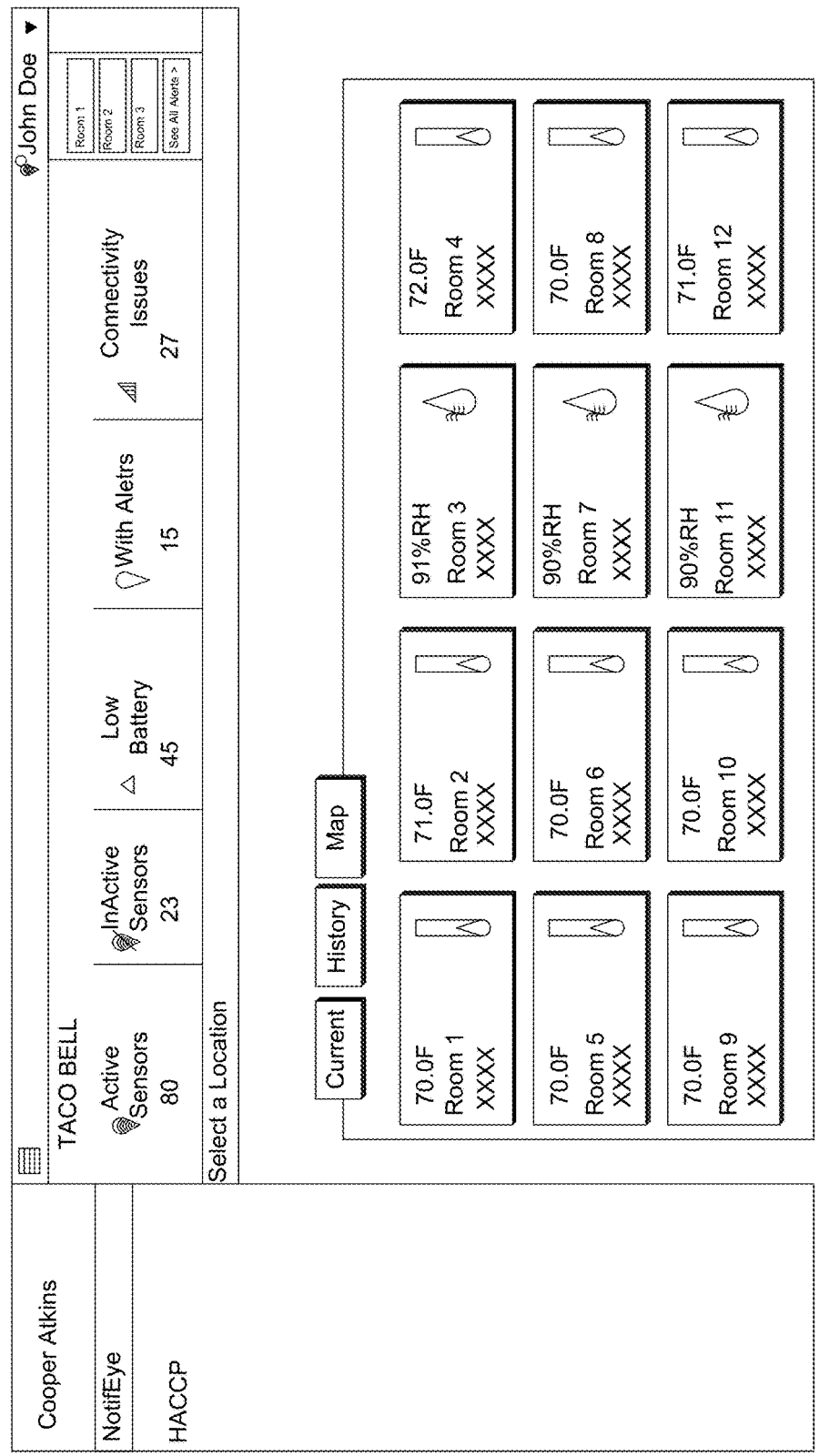
FIG. 24 is a screenshot of an example dashboard alert.
Figure 25:
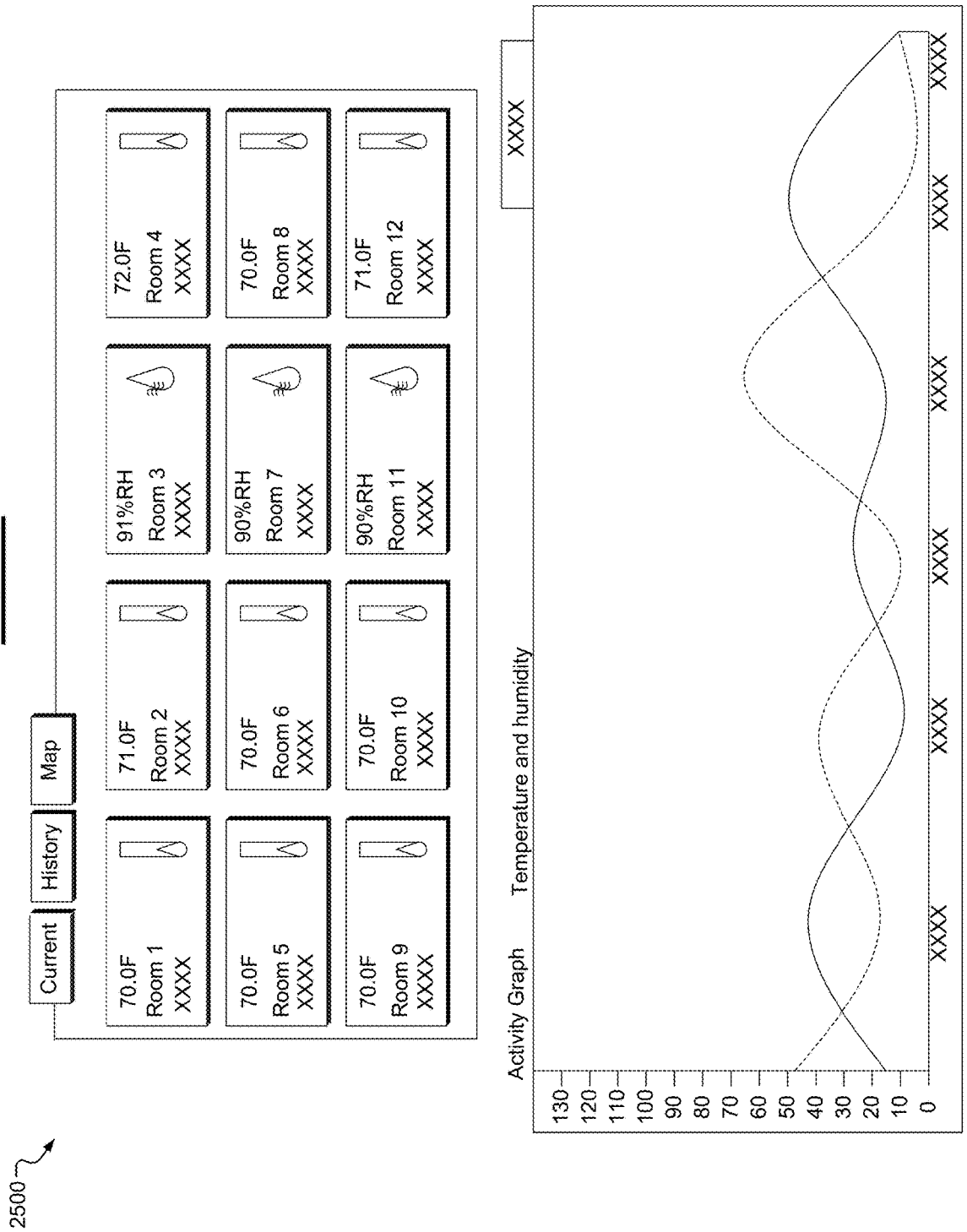
FIG. 25 is a screenshot of an example dashboard activity graph.
Figure 27:
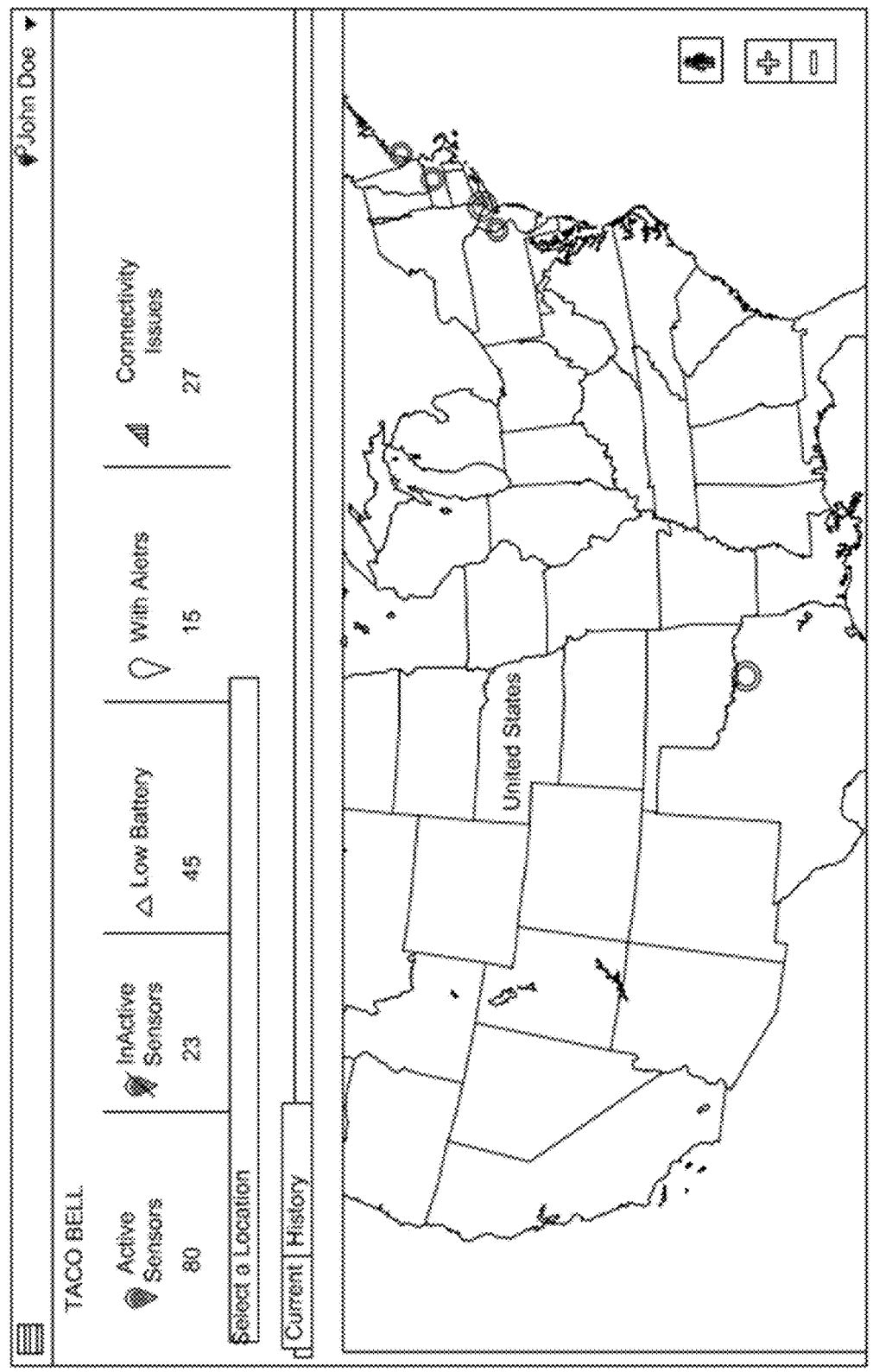
FIG. 27 is a screenshot of an example dashboard map view.
Figure 29:
FIG. 29 is a screenshot of an example payment and renewal checkout.
Figure 30:
FIG. 30 is a screenshot of an example NotifEye checklist.
Figure 31:
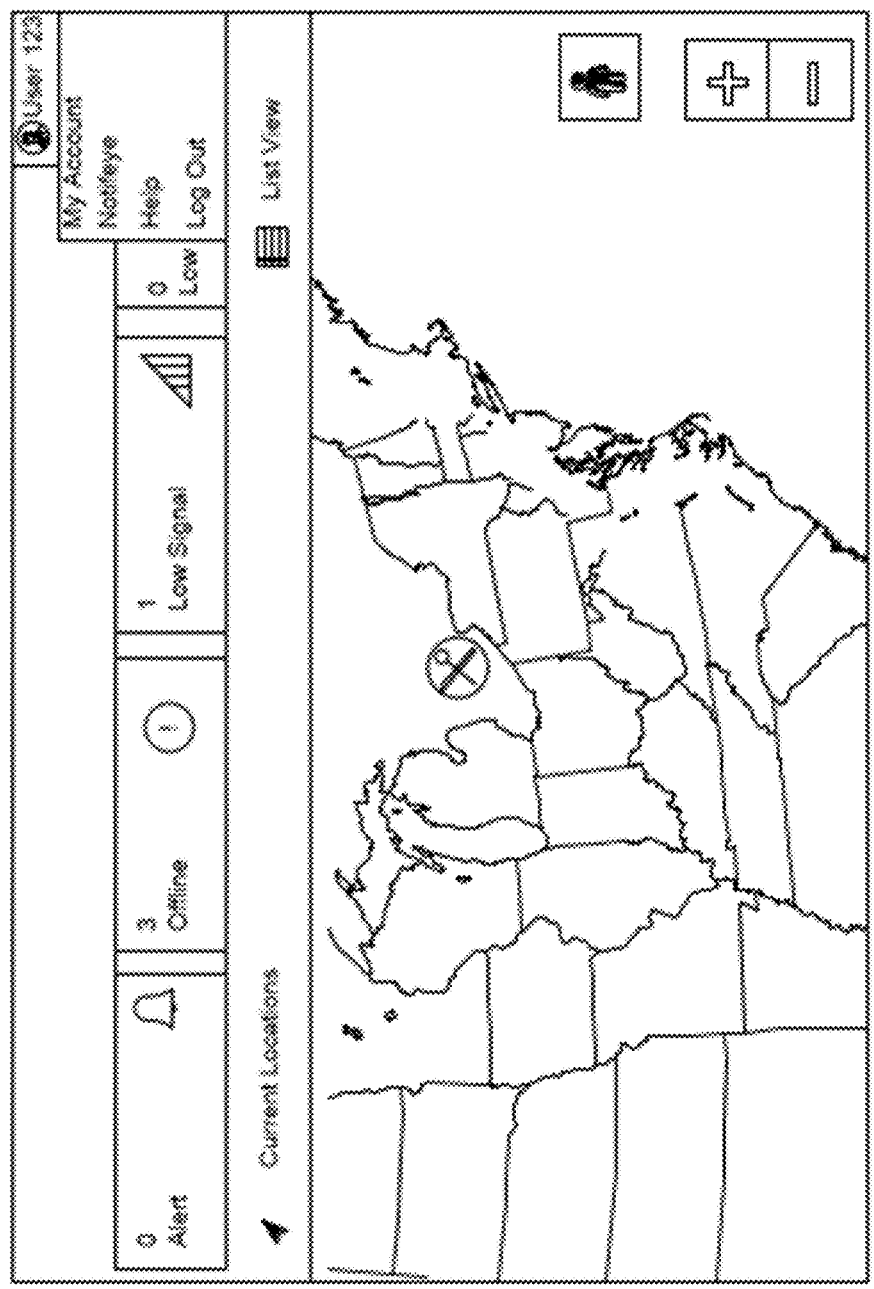
FIG. 31 is a screenshot of an example map.
Figure 32:
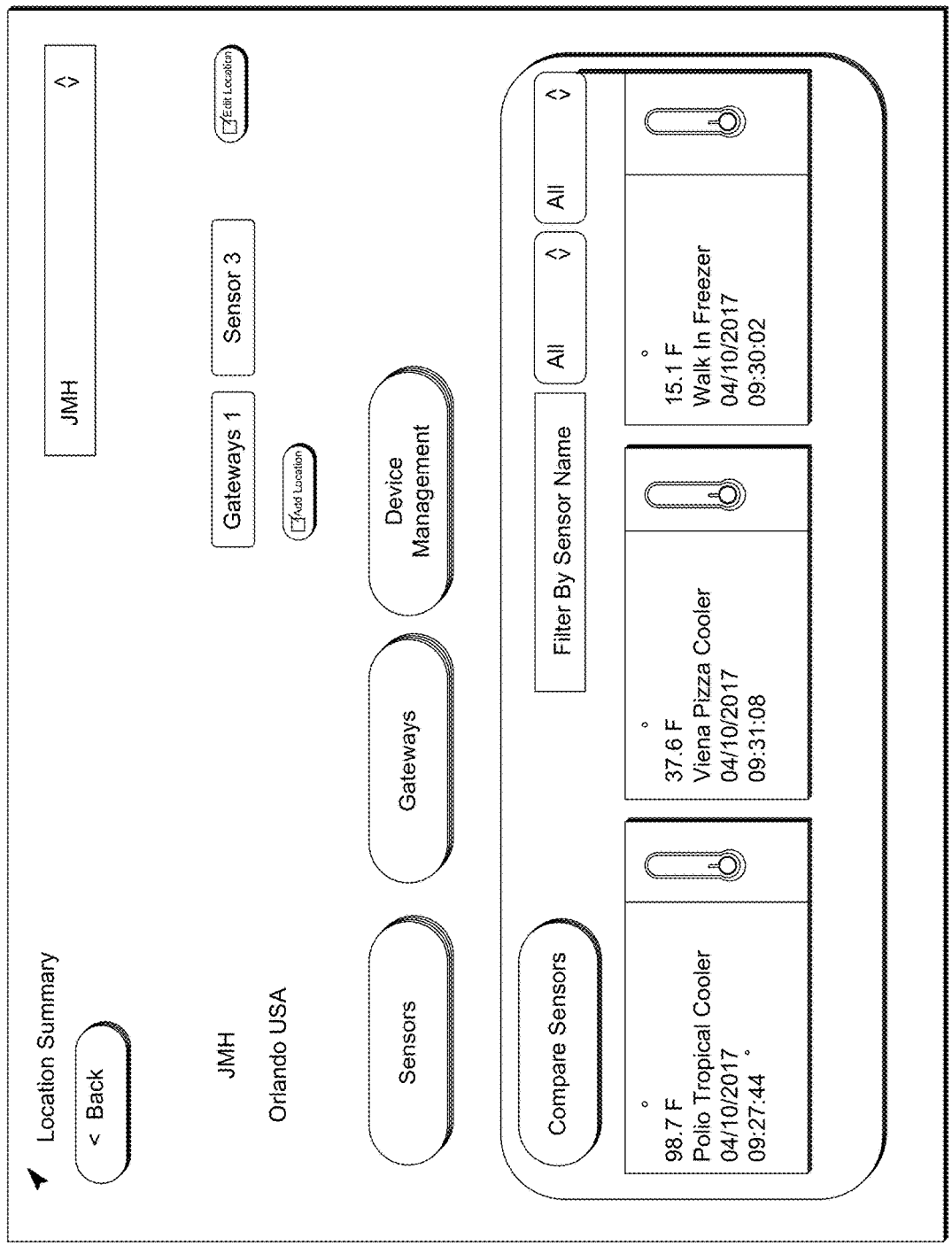
FIG. 32 is a screenshot of an example location summary.

Referring now to FIG. 9, a block diagram 900 of various industries that may provide data is shown. Referring now to FIG. 10, a screenshot 1000 of an example proposed solution capability and security is shown. Referring now to FIG. 11, a screenshot 1100 of an example logical solution is shown. Referring now to FIG. 12, a screenshot 1200 of an example project module classification is shown. Referring now to FIG. 13, a screenshot 1300 of an example current architecture is shown. Referring now to FIG. 14, a screenshot 1400 of an example proposed architecture is shown. Referring now to FIG. 15, a screenshot 1500 of an example integrated gateway framework is shown. Referring now to FIG. 16, a screenshot 1600 of another example integrated gateway framework is shown. Referring now to FIG. 17, a screenshot 1700 of an example framework provided to a security service layer is shown. Referring now to FIG. 18, a screenshot 1800 of an example use client security service provider is shown. Referring now to FIG. 19, a screenshot 1900 of an example security service authorization is shown. Referring now to FIG. 20, a screenshot 2000 of an example notification service is shown. Referring now to FIG. 21, a screenshot 2100 of an example payment service is shown. Referring now to FIG. 22, a screenshot 2200 of an example configuration service is shown. Referring now to FIG. 23, a screenshot 2300 of another example integrated gateway framework is shown. Referring now to FIG. 24, a screenshot 2400 of an example dashboard alert is shown. Referring now to FIG. 25, a screenshot 2500 of an example dashboard activity graph. Referring now to FIG. 26, a screenshot 2600 of an example dashboard history is shown. Referring now to FIG. 27, a screenshot 2700 of an example dashboard map view is shown. Referring now to FIG. 28, a screenshot 2800 of an example payment and renewal cart view is shown. Referring now to FIG. 29, a screenshot 2900 of an example payment and renewal checkout is shown. Referring now to FIG. 30, a screenshot 3000 of an example NotifEye checklist is shown. Referring now to FIG. 31, a screenshot 3100 of an example map is shown. Referring now to FIG. 32, a screenshot 3200 of an example location summary is shown. The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system, comprising:
a measurement instrument including a first connector, a control module electrically connected to the first connector, and a display housed on the measurement instrument;
a temperature probe including a shaft, a tip, and a second connector, the shaft having a first end and a second end, the second connector being coupled to the first end, the tip being coupled to the second end and configured to measure a change in voltage generated by a junction of wires within the tip after inserting the temperature probe into a sample, and the second connector being received by the first connector when the temperature probe is attached to the measurement instrument; and
a storage module housed within the second connector and configured to store one or more parameters of the temperature probe;
the control module being configured to:
receive the one or more parameters from the storage module;
prompt a user to select a sample type of the sample displayed on the display;
determine a thermal conductivity of the sample based on the selected sample type;
determine a stable time of the sample based on at least one of the one or more parameters and the thermal conductivity of the sample;
when a period greater than or equal to the stable time has elapsed, determine a temperature measurement based on the change in voltage; and
display the temperature measurement on the display.

2. The system of claim 1, wherein:
the first connector includes a pair of terminals electrically connected to the control module;
the second connector includes a pair of pin connectors electrically connected to the storage module; and
the pair of terminals and the pair of pin connectors are configured to transmit the one or more parameters from the storage module to the control module.

3. The system of claim 1, wherein the one or more parameters include at least one of an offset value of the temperature probe, an adjusted offset value of the temperature probe, a response time of the temperature probe, and a unique identifier of the temperature probe.

4. The system of claim 3, wherein the storage module is being configured to determine the response time of the temperature probe based on at least one of a placement of a junction in the tip, a size of the tip, a size of the shaft, a material of the tip, and a thermal conductivity of potting used to form the junction.

5. The system of claim 4, wherein the response time of the temperature probe increases as the junction moves closer to a surface of the tip.

6. The system of claim 4, wherein the control module is configured to determine the thermal conductivity of the sample based on a water content of the sample.

7. The system of claim 6, wherein the control module is configured to determine the stable time of the sample based on the response time of the temperature probe and the thermal conductivity of the sample.

8. The system of claim 7, wherein the control module is further configured to store a record that associates the unique identifier of the temperature probe with the temperature measurement.

\* \* \* \* \*